(12) United States Patent
Mather et al.

(10) Patent No.: US 8,154,686 B2
(45) Date of Patent: Apr. 10, 2012

(54) DIRECTIONAL BACKLIGHT, A MULTIPLE VIEW DISPLAY AND A MULTI-DIRECTION DISPLAY

(75) Inventors: Jonathan Mather, Oxford (GB); Neil Barratt, Walsall (GB); Diana U. Kean, Oxfordshire (GB); Emma J. Walton, Oxford (GB); Grant Bourhill, Stow-on-the-Wold (GB); Thomas Wynne Powell, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 658 days.

(21) Appl. No.: 11/814,383

(22) PCT Filed: Jan. 21, 2005

(86) PCT No.: PCT/IB2005/050246
§ 371 (c)(1),
(2), (4) Date: Jun. 25, 2008

(87) PCT Pub. No.: WO2005/071474
PCT Pub. Date: Aug. 4, 2005

(65) Prior Publication Data
US 2009/0040426 A1    Feb. 12, 2009

(51) Int. Cl.
*G02F 1/13357* (2006.01)
(52) U.S. Cl. .......................... 349/65; 362/97.2
(58) Field of Classification Search ........................ None
See application file for complete search history.

(56) References Cited

U.S. PATENT DOCUMENTS
5,151,801 A * 9/1992 Hiroshima ...................... 349/95
(Continued)

FOREIGN PATENT DOCUMENTS
GB     2337388     11/1999
(Continued)

OTHER PUBLICATIONS

Japanese Office Action for corresponding Japanese Application No. 2007-548922 dated Jun. 4, 2010.

(Continued)

*Primary Examiner* — Mike Stahl
(74) *Attorney, Agent, or Firm* — Renner, Otto, Boisselle & Sklar, LLP

(57) ABSTRACT

A directional backlight, a multiple view display and a multi-direction display A multiple view display (18) comprises a directional display device (19) for displaying a first image or sequence of images so as to be mainly visible from a first range of directions relative to the device and for simultaneously displaying a second image or sequence of images so as to be mainly visible from a second range of directions relative to the device different from the first range. The display (18) further comprises a directional backlight (20) for directing light through the display device (19) at least mainly in the first and second ranges. Since the directional backlight (20) directs light through the display device (19) at least mainly in the first and second ranges, the display provides users located in the first and second ranges with images of greater intensity than a conventional display. The backlight may be arranged to direct substantially no light in at least part of a third range of directions that lies between the first range of directions and the second range of directions. This provides a 'black window' between the first and second ranges in which the intensity of the display is lower than in other ranges. The intensity of the display in the black window is possibly zero, or close to zero, so that an observer located in this window will not perceive an image.

38 Claims, 21 Drawing Sheets

U.S. PATENT DOCUMENTS

| | | | |
|---|---|---|---|
| 5,396,406 A * | 3/1995 | Ketchpel | 362/27 |
| 5,467,208 A * | 11/1995 | Kokawa et al. | 349/67 |
| 5,833,344 A | 11/1998 | Arai et al. | |
| 6,061,083 A | 5/2000 | Aritake et al. | |
| 6,099,134 A | 8/2000 | Taniguchi et al. | |
| 6,231,201 B1 * | 5/2001 | Rupp | 362/614 |
| 6,252,707 B1 | 6/2001 | Kleinberger et al. | |
| 6,700,701 B1 * | 3/2004 | Son et al. | 359/443 |
| 6,999,110 B2 | 2/2006 | Kobayashi | |
| 7,054,068 B2 * | 5/2006 | Yoshida et al. | 359/624 |
| 2002/0064037 A1 | 5/2002 | Lee | |
| 2004/0130882 A1 * | 7/2004 | Hara et al. | 362/31 |
| 2004/0263451 A1 * | 12/2004 | Muto | 345/87 |
| 2006/0221642 A1 * | 10/2006 | Daiku | 362/626 |

FOREIGN PATENT DOCUMENTS

| | | | |
|---|---|---|---|
| GB | 2406731 A * | 4/2005 | |
| JP | 02-066515 | 3/1990 | |
| JP | 9-289655 A | 11/1997 | |
| JP | 2000-284268 A * | 10/2000 | |
| JP | 2001-042258 | 2/2001 | |
| JP | 2002-072135 A | 3/2002 | |
| JP | 2002-350772 | 12/2002 | |
| WO | WO 2004/088996 A1 * | 10/2004 | |

OTHER PUBLICATIONS

International Search Report for corresponding Application No. PCT/IB2005/050246 mailed Aug. 30, 2005.

T. Sasagawa et al.; "Dual Directional Backlight for Stereoscopic LCD"; 2003 SID International Symposium Digest of Technical Papers; Baltimore, MD; May 20-22, 2003; SID International Symposium Digest of Technical Papers; San Jose, CA; vol. 34/1; pp. 399-401; XP001171732.

* cited by examiner

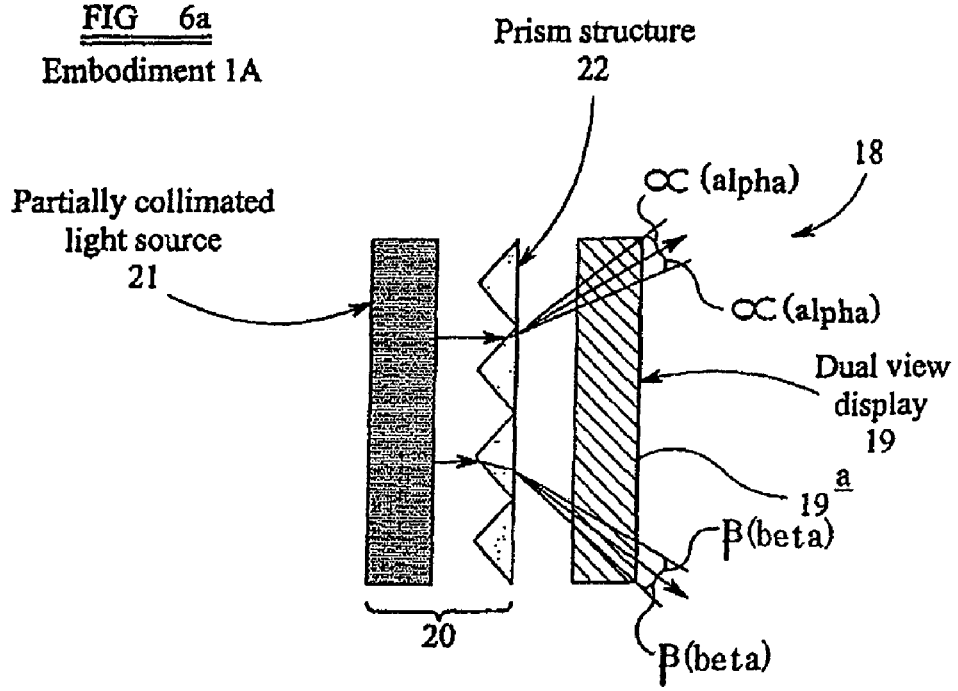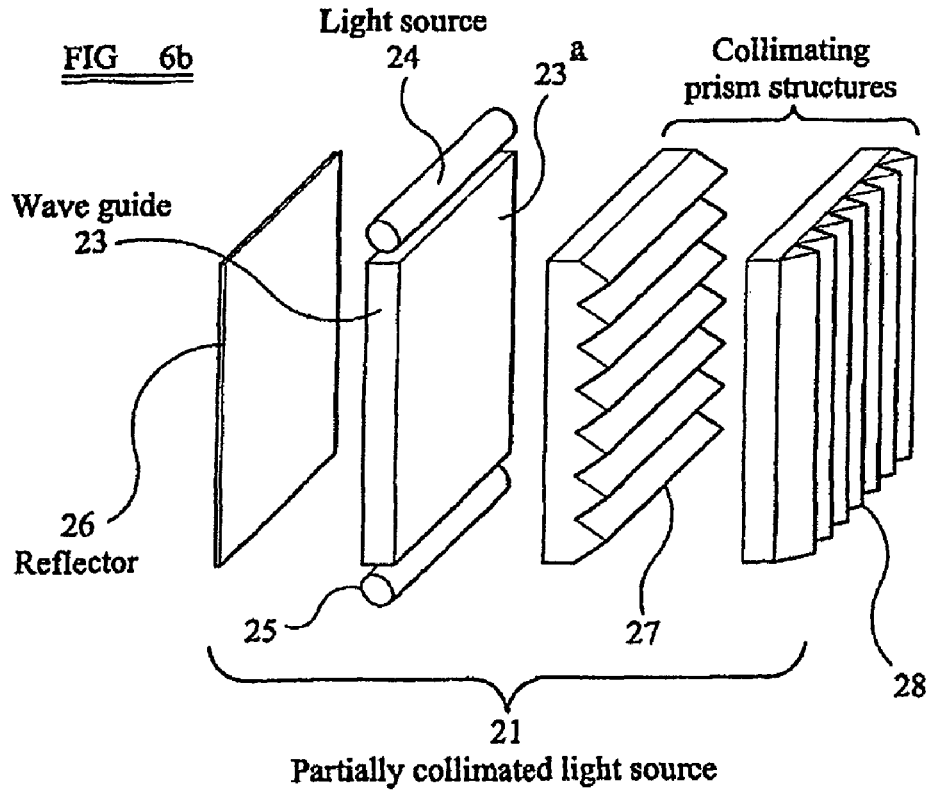

- ◆ Standard prism backlight
- × Prism backlight for duel view

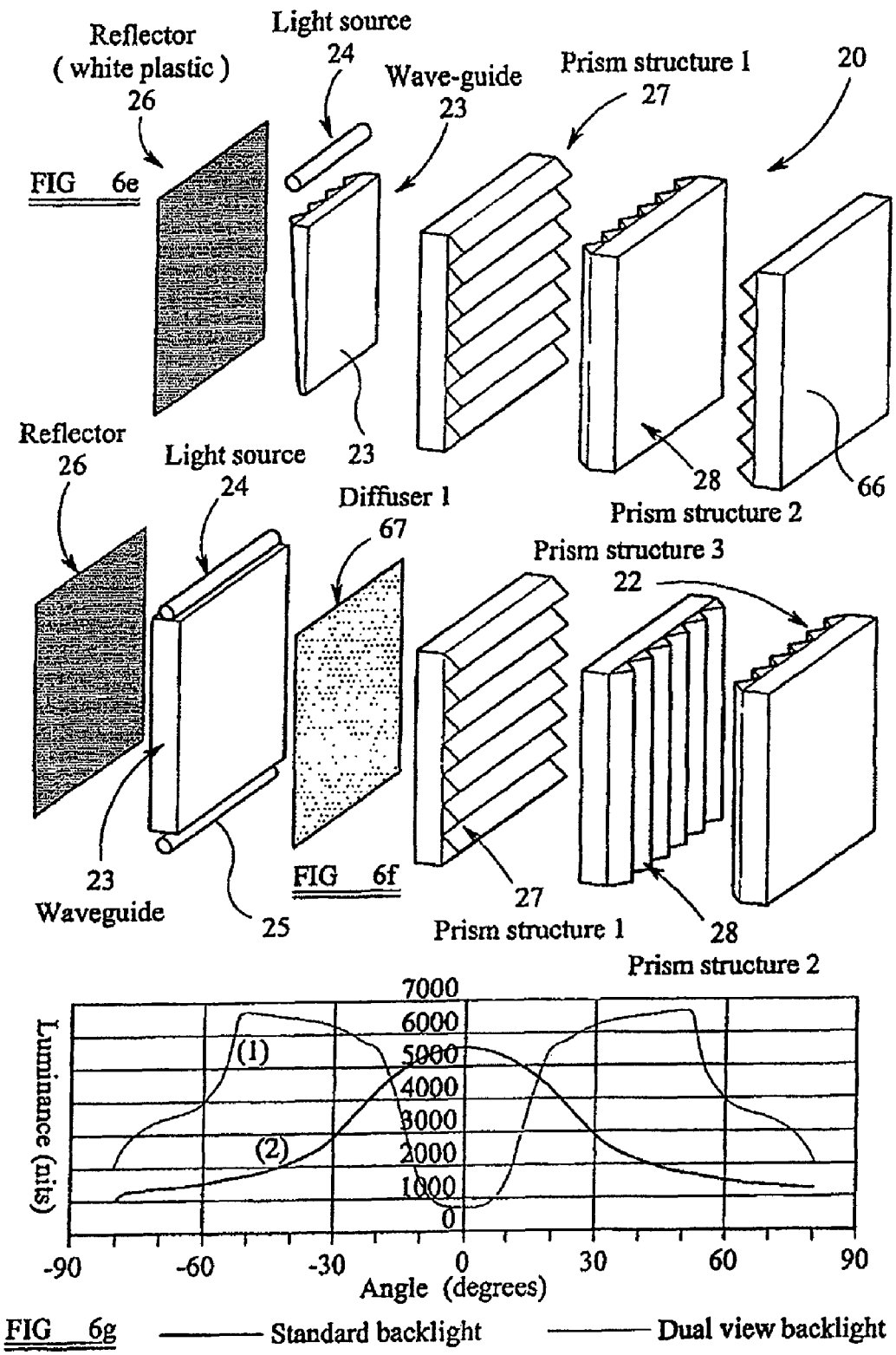

Embodiment 2

Embodiment 3

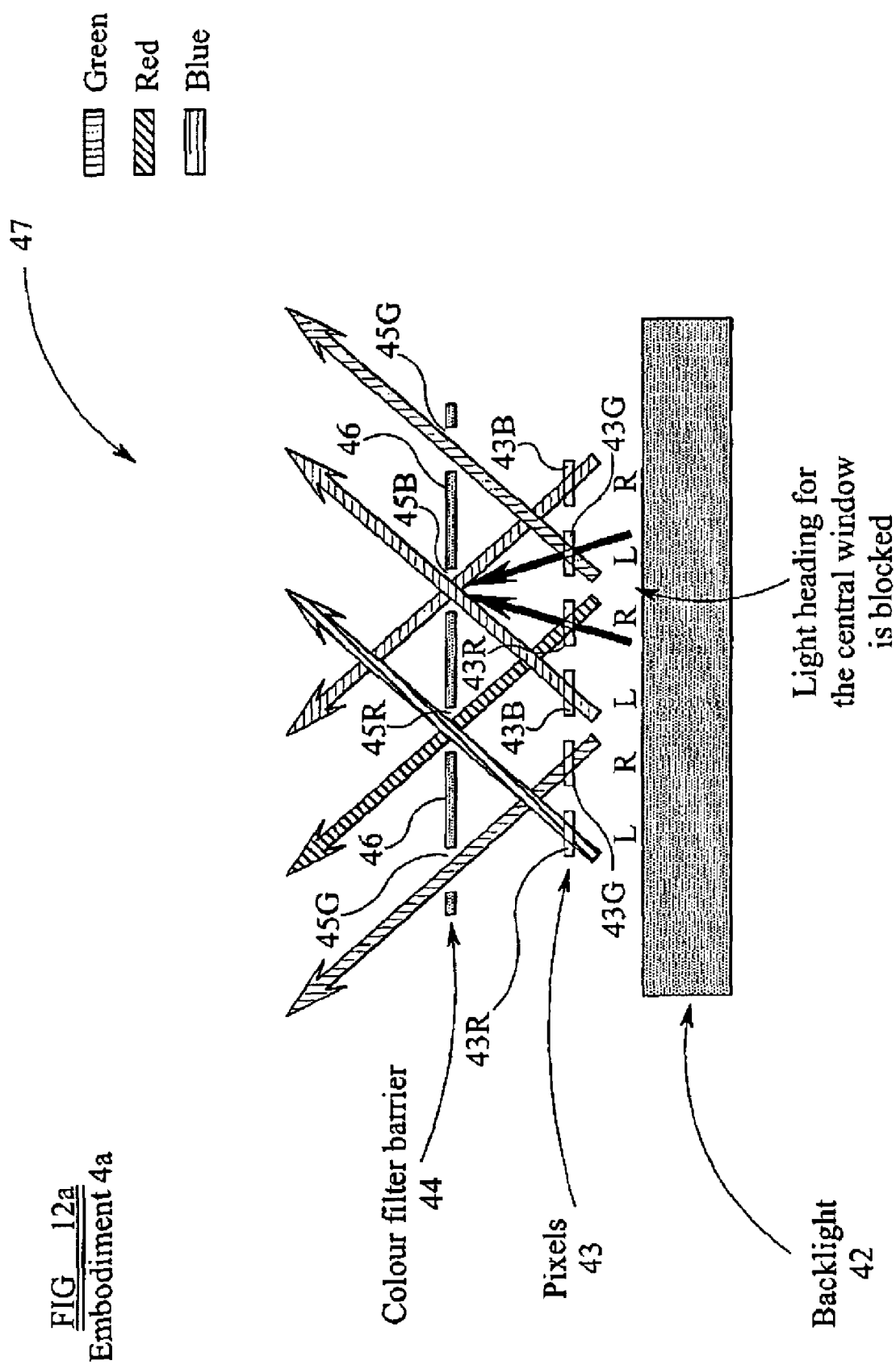

Embodiment 4b

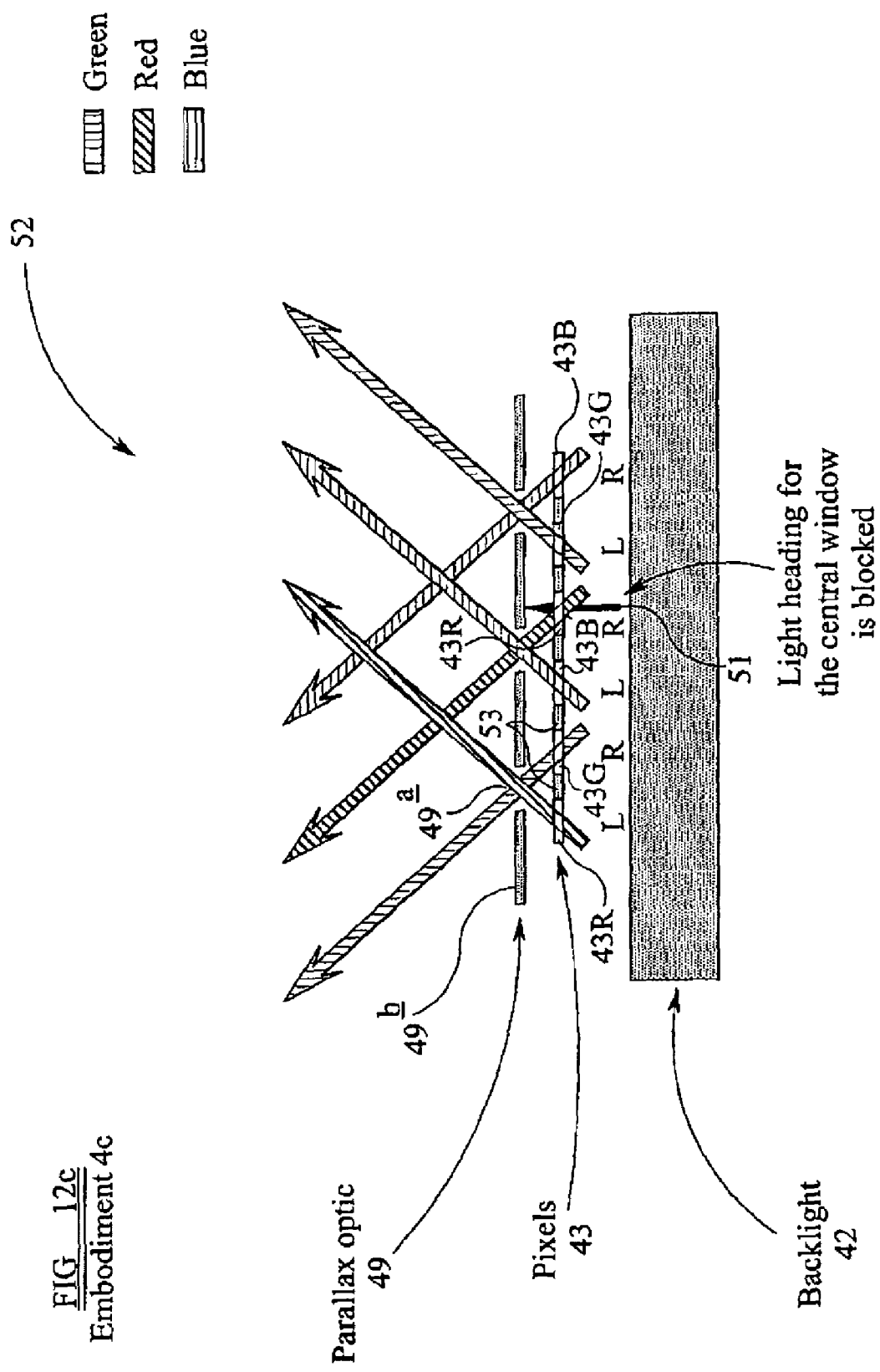

Embodiment 5

Embodiment 6

Embodiment 7

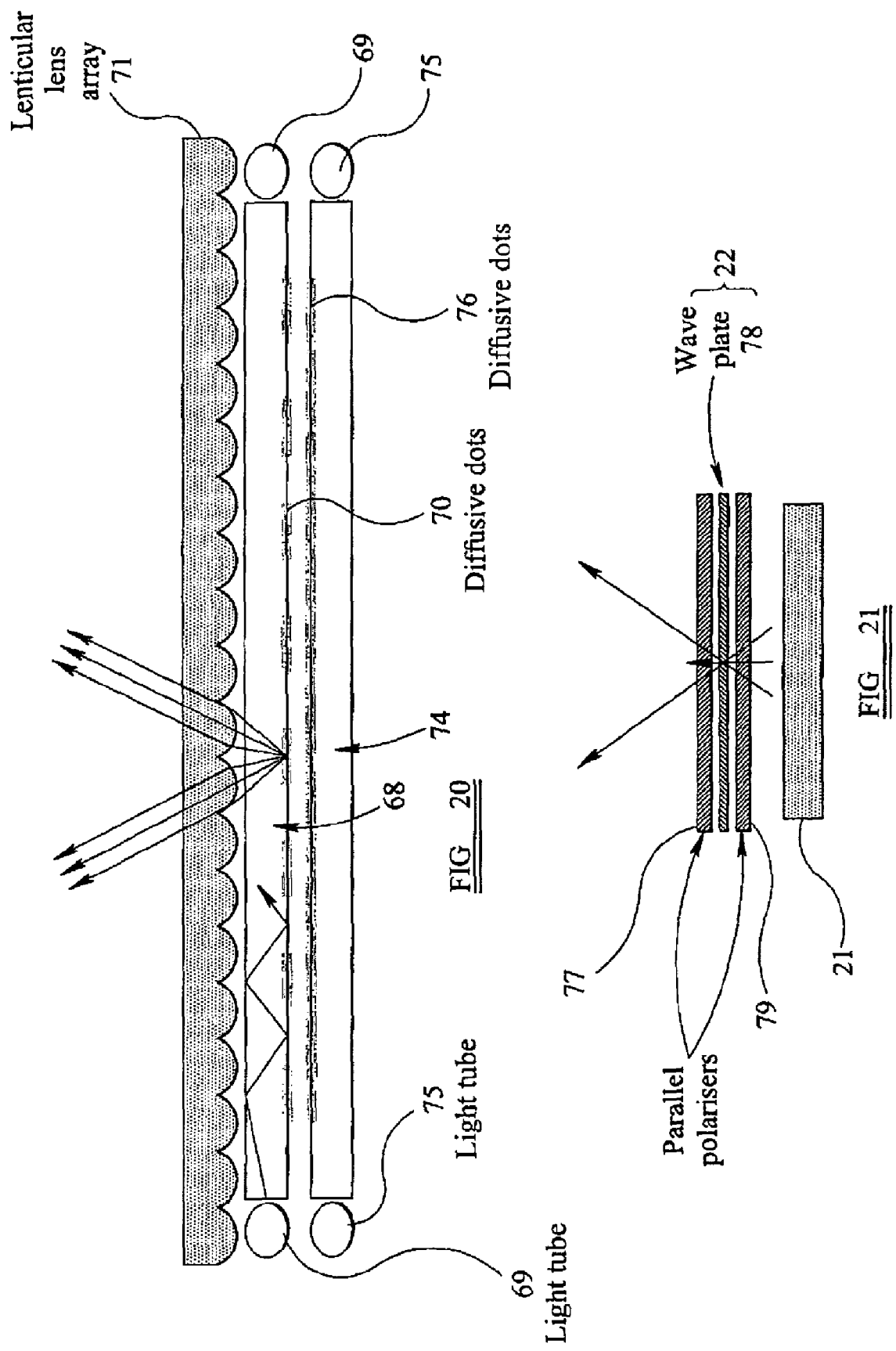

DIRECTIONAL BACKLIGHT, A MULTIPLE VIEW DISPLAY AND A MULTI-DIRECTION DISPLAY

FIELD OF THE INVENTION

The present invention relates to a multiple-view directional display, which displays two or more images such that each image is visible from a different direction. Thus, two observers who view the display from different directions will see different images to one another. Such a display may be used in, for example, an autostereoscopic 3-D display device or a dual view display device. The invention also relates to a multi-direction display for displaying a single image at a time so as to be visible throughout a range of directions including first and second ranges for first and second viewers. The invention also relates to a directional backlight.

BACKGROUND OF THE INVENTION

One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays.

A further application of a multiple view directional display is in producing a three-dimensional image. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called 'stereoscopic pair' of images, one image to each eye of the observer.

Three dimensional displays are classified into two types depending on the method used to supply the different views to the eyes;

Stereoscopic displays typically display both of the images over a wide viewing area. However, each of the views is encoded, for instance by colour, polarisation state or time of display, so that a filter system of glasses worn by the observer can separate the views and will only let each eye see the view that is intended for it.

Autostereoscopic displays require no viewing aids to be worn by the observer. Instead, the two views are only visible from defined regions of space. The region of space in which an image is visible across the whole of the display active area is termed a 'viewing region'. If the observer is situated such that the left eye is in the left image viewing region and the right eye is in the right image viewing region, then a correct set of views will be seen and a three-dimensional image will be perceived.

For flat panel autostereoscopic displays, the formation of the viewing regions is typically due to a combination of the pixel structure of the display unit and an optical element, generically termed a parallax optic. An example of such an optic is a parallax barrier, which is a screen with vertical transmissive slits separated by opaque regions. This screen can be set in front of a spatial light modulator (SLM) with a two-dimensional array of pixel apertures as shown in FIG. 1.

The pitch of the slits in the parallax barrier is chosen to be close to an integer multiple of the pixel pitch of the SLM so that groups of columns of pixels are associated with a specific slit of the parallax barrier. FIG. 1 shows an SLM in which two pixel columns are associated with each slit of the parallax barrier.

The display shown in FIG. 1 comprises an SLM in the form of a liquid crystal device (LCD) having an active matrix thin film transistor (TFT) substrate 1 and a counter-substrate 2, between which are disposed a liquid crystal layer forming a picture element (pixel) plane 3 with associated electrodes and alignment layers (not shown) as appropriate. Viewing angle enhancement films 4 and polarisers 5 are provided on the outer surfaces of the substrates 1 and 2 and illumination 6 is supplied from a backlight (not shown). A parallax barrier comprises a substrate 7 with a barrier aperture array 8 formed on its surface adjacent the LCD and an anti-reflection (AR) coating 9 formed on the other surface thereof.

The pixels of the LCD are arranged as rows and columns with the pixel pitch in the row or horizontal direction being p. The aperture array 8 comprises vertical transmissive slits with a slit width of 2 w and a horizontal pitch b. The plane of the barrier aperture array 8 is spaced from the pixel plane 3 by a distance s.

In use, two interlaced images—a left eye image and a right eye image in the case of an autostereoscopic 3-D display—are displayed on the pixel plane 3 of the SLM. The display forms a left viewing window 10 in which the left eye image is visible and a right viewing region 11 in which the right eye image is visible in a window plane at the desired viewing distance of the display. The window plane is spaced from the plane of the aperture array 8 by a distance $r_o$. The windows 10 and 11 are contiguous in the window plane and have a width and pitch e corresponding to the average human eye separation. The half angle to the centre of each window 10, 11 from the display normal is illustrated at alpha.

FIG. 2 of the accompanying drawings shows the angular zones of light created from an SLM 12 and parallax barrier 13 where the parallax barrier has a pitch of an exact integer multiple of the pixel column pitch. In this case, the angular zones coming from different locations across the display panel surface intermix and a pure zone of view for image 1 or image 2 does not exist. In order to address this, for example for a front parallax optic, the pitch of the parallax optic is reduced slightly so that the angular zones converge at a pre-defined plane (termed the 'window plane') in front of the display. This change in the parallax optic pitch is termed 'viewpoint correction' and the effect is illustrated in FIG. 3 of the accompanying drawings. The viewing regions, when created in this way, are roughly kite shaped in plan view.

FIG. 4 of the accompanying drawings illustrates another known type of directional display in the form of a rear parallax barrier display. This is generally similar to the display of FIG. 1 except that in the front parallax barrier display shown in FIG. 1 the parallax barrier is disposed between the SLM and the viewing windows 10 and 11 whereas, in the rear parallax barrier display shown in FIG. 4, the SLM is disposed between the parallax barrier and the viewing windows 10 and 11.

FIGS. 1 and 4 describe an autostereoscopic display. A dual view display operates in an identical manner, but the angle of separation between the different images is larger. Instead of the two images being sent to left and right eyes (approximately 6.2 cm apart), images are sent to left and right people (separated by, for example, one metre). The two images displayed on the pixel plane of the SLM are not the left eye image and the right eye image of a stereoscopic image pair, but are two independent images. Where a dual view display is installed in a motor vehicle, for example, one image may be sent to the driver and another image may be sent to a passenger in the front passenger seat. The driver may see a road map, whereas the front seat passenger may see a film.

A multiple view directional display may display more than two images. To use the above example of a display installed in a motor vehicle, a display may be arranged to send a further view to a passenger in the back seat. The term 'dual view display' as used herein is not limited to a display that displays two independent views in two different directions, but also includes a directional display that display three (or more) independent images in three (or more) different directions.

FIG. 5a is a schematic plan view showing a dual view display installed in a motor vehicle. The display is displaying one image to the driver 15 of the vehicle and is displaying a second image to a front seat passenger 16. The regions 15a, 16a outlined in broken lines indicate the viewing regions for the driver's image and the passenger's image respectively. A dual view display in a motor vehicle is generally installed in the vehicle's dashboard, so that the driver 15 and front seat passenger 16 both view the display at a direction of approximately 40° to the normal of the display. Reference 17 denotes an 'image mixing region' in which both the driver's image and the passenger's image are visible. The image mixing region is centred about the normal to the display 14, and an observer located in the image mixing region 17 will perceive cross-talk.

Trace (a) in FIG. 5b shows how the intensity of a typical liquid crystal display panel varies as a function of the lateral position of the observer relative to the display.

It can be seen that the LCD panel is optimised for viewing in the direction normal to the display face of the panel (referred to as 'on axis'). At viewing angles greater than approximately ±20° to the normal of the display the intensity decreases significantly.

When the LCD panel is viewed from an angle of ±40° the intensity is reduced by almost 50% compared to the on-axis intensity. When a conventional LCD panel is used in the dual view display 14 of FIG. 5a, therefore, the driver 15 and passenger 16 will see an image that has a low intensity.

Furthermore, at a viewing angle of ±40° the intensity of the conventional LCD panel varies steeply with changes in the viewing angle. Thus, if the driver 15 or passenger 16 in FIG. 5a should move their head sideways the intensity of the image they see will vary, and this is irritating and could possibly cause discomfort.

Trace (b) in FIG. 5b shows an ideal intensity profile for the dual view display 14 of FIG. 5a. The intensity would ideally have maxima at viewing angles of ±40° to the normal to the display face and, moreover, the variation of intensity with viewing angle would ideally be small at viewing angles of ±40°. The intensity of the display would ideally be low for viewing angles near 0° (i.e. for angles near the normal to the display face), since light emitting at angles near 0° is wasted. Furthermore viewing directions that are along, or close to, the normal to the display face are in the image mixing region 17, and making the intensity of the display low for viewing angles near 0° means that an observer positioned in the image mixing region 17 will not experience cross-talk.

ACKNOWLEDGEMENT OF THE PRIOR ART

'Dual directional backlight for Stereoscopic LCD', Mitsubishi Electric Corporation, SID 03 Digest, p 399 describes a directional backlight having two light sources that can be used with a conventional LCD panel to generate a time-multiplexed stereoscopic image pair. A prism and lens structure is used to direct the light from one source to the user's left eye and to direct light from the other source to the user's right eye. In a first time frame a left eye image is displayed and only the first light source is illuminated so that the left eye image is sent to the user's left eye. In a second time frame a right eye image is displayed and only the second light source is illuminated so that the right eye image is sent to the user's right eye. This backlight has the disadvantage that light would not go to the left user and the right user simultaneously so that the average brightness of the display would be low. Furthermore, in order to display moving images the LCD panel is required to operate at approximately 120 Hz (twice the normal picture refresh rate), and this is difficult to achieve.

GB-A-2 337 388A describes an autostereoscopic 3-D display in which a directional display panel (constituted by an SLM and a parallax barrier) is illuminated by a backlight. Light from the backlight is directed mainly into the ranges of directions in which the left eye image and right eye image are displayed by the SLM. The backlight acts as a directional illuminator in order to provide a black window between the left-eye image and the right-eye image and so prevent cross-talk.

WO 02/12930 describes an autostereoscopic 3-D display in which a liquid crystal panel is illuminated by a backlight. Light from the backlight is collimated, and then passes through two holograms. The second hologram directs light into first and second viewing zones, so that the backlight and holograms form a directional backlight. The liquid crystal panel is a conventional LCD display panel and is not a directional display panel.

WO 94/23340 describes a 3-D display device in which a transmissive display panel is illuminated by collimated light obtained by collimating light from a backlight using a collimating lens. The directional display effect is provided by a prism mask disposed in front of the display panel.

WO 03/003100 describes a 3-D display in which images are displayed on separate displays rather interlaced on a single display. The different views are directed in appropriate directions by the use of prism arrangements.

U.S. Pat. No. 6,172,807 describes a time-multiplex autostereoscopic display. The backlight comprises two light sources, and a stereoscopic effect is obtained by switching between these light sources and simultaneously changing the image displayed on a display panel. The display panel is not a directional display panel, and the directional effect is achieved solely by switching between the left light source and the right light source so as to vary the effective position of the backlight. A diffusion board is provided over the backlight, to provide a uniform level of illumination over the viewing windows.

WO 02/05014 describes a 3-D display having a backlight. Light from the backlight is directed by two prism arrays towards two viewing zones. The display does not have a directional display panel—the display has a conventional LCD panel, and a 3-D effect is provided solely by the directional light source.

GB 2 317 710 describes a display having two liquid crystal layers. One liquid crystal layer acts as an image display layer, and a 'dynamic parallax barrier' is defined in the other image display layer. The display is illuminated by a conventional backlight.

GB 2 320 156 describes a directional display having a backlight, a rear parallax barrier, and a spatial light modulator. A mask is provided between the backlight and the parallax barrier. The transmissivity of the apertures in the mask is varied so as to compensate for intensity variations in a viewing window caused by, for example, diffraction at the pixels.

The backlight emits diffuse light and is not a directional backlight.

WO 2004/036286 discloses a directional display having a display layer and an 'un-braiding viewing angle manipulation means' which manipulates the viewing angle of the images displayed on the display layer. Where two interlaced images are displayed on the display layer, each individual image is presented at a viewing angle determined by the un-braiding viewing angle manipulation means' This allows the two images to be presented to viewers in different viewing positions.

DE 101 40 688 discloses a display having an image display layer that can display two images. A prism array is disposed in front of the image display layer, and directs the two images into respective viewing windows.

SUMMARY OF THE INVENTION

A first aspect of the invention provides a directional backlight comprising a light source and an optical arrangement for directing light from the light source at least mainly in a first range of directions and a second range of directions different from the first range of directions; wherein the optical arrangement comprises a plurality of prisms Where a directional backlight of the invention is used to illuminate a display panel, since the directional backlight directs light through the display panel at least mainly in the first and second ranges, users located in the first and second ranges are provided with images of greater intensity than in the conventional display of FIG. 5a. Where a backlight of this aspect of the invention is applied in a dual view display, for example, the first and second ranges would correspond to the angular positions of two users viewing the display.

The prisms may have a prism angle of less than 110°. They may have a prism angle of greater than 70°. They may have a prism angle of approximately 83°.

The prisms may be arranged as an array of variable pitch.

A second aspect of the invention provides a directional backlight comprising a light source and an optical arrangement for directing light from the light source at least mainly in a first range of directions and a second range of directions different from the first range of directions; wherein the optical arrangement comprises an array of substantially non-light-transmissive blocking elements and an array of imaging elements; and wherein each imaging element is substantially aligned with a respective one of the blocking elements thereby reducing or substantially preventing light from being directed between the first and second ranges.

The blocking elements may be reflective for recycling light.

The light source may be arranged to supply at least partially collimated light.

The light source may comprise a plurality of apertures aligned with imaging elements.

The apertures may be separated by reflectors for reflecting light.

A third aspect of the invention provides a directional backlight comprising a light source and an optical arrangement for directing light from the light source at least mainly in a first range of directions and a second range of directions different from the first range of directions; wherein the optical arrangement comprises a waveguide having a plurality of diffusive regions and an array of imaging elements disposed in the optical path of light from the waveguide.

The light source may extend substantially along one side face of the waveguide.

The directional backlight may comprise a second light source, the second light source extending substantially along another side face of the waveguide.

The optical arrangement may be arranged to direct light from the light source at least mainly in the first range of directions, the second range of directions, a third range of directions and a fourth range of directions, the third range of directions being different from the first range of directions and the second range of directions and the fourth range of directions being different from the first range of directions, the second range of directions and the third range of directions. When such a backlight is used in, for example, a dual view display, the display can provide four different views. The views may be arranged, for example as two laterally-separated views above two laterally-separated views.

A fourth aspect of the invention provides a display comprising: a display device for displaying at least a first image or first sequence of images; and a directional backlight of the first, second or third aspect of the invention for directing light through the device at least mainly in a first range of directions relative to the device and a second range of directions relative to the device different from the first range of directions.

A display of the invention may have a conventional display panel. Where a display is provided in a motor car, for example, a directional backlight as described herein would increase the intensity seen by the driver and a front seat passenger, and this may be of benefit even if the display is a conventional display that directs the same image to both the driver and the passenger. In a preferred embodiment, however, the display device is a directional display device for displaying the first image or sequence of images so as to be mainly visible from the first range of directions relative to the device and for simultaneously displaying a second image or sequence of images so as to be mainly visible from the second range of directions relative to the device.

The first and second ranges may be on opposite sides of the normal to a display surface of the device.

The first and second ranges may be substantially symmetrical with respect to the normal.

The first image may be substantially not visible from the second range.

The second image may be substantially not visible from the first range.

The first and second ranges may be separated by a third range of directions.

The backlight may be arranged to direct substantially no light in at least part of the third range. This provides a 'black window' between the first and second ranges. The intensity of the display in the black window is lower than in other ranges, and is possibly zero or close to zero so that an observer located in the black window will not perceive an image.

The second image or sequence of images may be spatially multiplexed with the first image or sequence of images.

A fifth aspect of the present invention provides a multi-direction 2-D display comprising: a display device for displaying a single image at a time, which image is visible throughout a range of directions including first and second ranges for first and second viewers, the first and second ranges being disposed on opposite sides of and spaced from the normal to a display surface of the device: and a directional backlight for directing light through the device with higher intensity in the first and second ranges than in a third range including the normal. A display according to this aspect of the invention may be used to provide a time-multiplex directional display, provided that the backlight can be switched between a mode in which it directs light primarily in the first range of directions and a mode in which it directs light primarily in the second range of directions. In a time-multiplex directional display the image displayed in each time frame can be displayed over the entire display area of the display device, so that the images are displayed with the full resolution of the display device. Since the directional backlight directs light through the device at least mainly in the first and second ranges, the display provides users located in the first and second ranges with images of greater intensity than the conventional display of FIG. 5a. The first and second ranges again correspond to, for example, the angular positions of two users viewing the display.

The first and second ranges may be substantially symmetrical with respect to the normal.

The intensity in the third range may be non-zero.

The backlight may be switchable between a first mode, in which light is mainly directed in the first range, and a second mode, in which light is mainly directed in the second range.

The display may comprise a controller for repeatedly switching the backlight between the first and second modes and for controlling the device to display a first image or sequence of images when the backlight is in the first mode and a second image or sequence of images when the backlight is in the second mode. As noted above, this enables the display to operate as a time-multiplex directional display.

The backlight may comprise first and second light sources disposed at opposite edges of a substantially rectangular generally planar light guide.

A sixth aspect of the present invention provides a multiple view display comprising: a display device for displaying first and second images or sequences of images; a backlight for directing light through the device; and an observing arrangement for permitting the first and second images or sequences of images to be visible from first and second ranges of directions, respectively, and for preventing the first and second images or sequences of images from being visible from a third range of directions including the normal to a display surface of the device, the first and second ranges being non-overlapping with the third range; wherein the observing arrangement comprises a plurality of transmissive regions, each of which is arranged to be substantially non-transmissive to light from at least one adjacent pixel and to be substantially transmissive to light from at least one non-adjacent pixel.

Where the invention is applied to a dual view display intended for use in a motor vehicle, for example, the third range of directions, in which the images cannot be seen, may cover the position of a central rear seat passenger. With a conventional dual view display a central rear seat passenger would be positioned in the image mixing region and would see both images, and this would be irritating and could cause discomfort. If the third range of directions of a display of the invention is made large enough to accommodate the head of a central rear seat passenger, the passenger will not see either image. (It is preferable if the lateral extent at the third range of directions, at the rear seat of the vehicle is comparable in extent to width of the head of a human, so that a left or right rear seat passenger would not be located in the third range of directions.)

The pixels may be arranged as groups of different colours and the observing arrangement comprises a plurality of colour filter slits, each of which substantially blocks the colour of light from at least one adjacent pixel and transmits the colour of light from at least one non-adjacent pixel.

Alternatively, the pixels may be arranged as groups of different output polarisations and the observing arrangement comprises a plurality of polarising slits, each of which substantially blocks the polarisation of light from at least one adjacent pixel and transmits the polarisation of light from at least one non-adjacent pixel.

A seventh aspect of the invention provides a multiple view display comprising: a display device for displaying first and second images or sequences of images; a backlight for directing light through the device; and an observing arrangement for permitting the first and second images or sequences of images to be visible from first and second ranges of directions, respectively, and for preventing the first and second images or sequences of images from being visible from a third range of directions including the normal to a display surface of the device, the first and second ranges being non-overlapping with the third range; wherein the observing arrangement comprises a first parallax barrier having a plurality of slits and a second parallax barrier having a plurality of slits, each slit of the second parallax barrier being disposed above a gap between adjacent slits of the first parallax barrier.

Each slit of the first parallax barrier may be disposed above a gap between an adjacent pair of pixels.

An eighth aspect of the invention provides a multiple view display comprising: a display device for displaying first and second images or sequences of images; a backlight for directing light through the device; and an observing arrangement for permitting the first and second images or sequences of images to be visible from first and second ranges of directions, respectively, and for preventing the first and second images or sequences of images from being visible from a third range of directions including the normal to a display surface of the device, the first and second ranges being non-overlapping with the third range; wherein the observing arrangement comprises a plurality of colour-selective reflectors, each of which is arranged to reflect the colour of light from at least one adjacent pixel and to transmit the colour of light from at least one non-adjacent pixel.

The first and second ranges may be on opposite sides of the normal.

The first and second ranges may be substantially symmetrical with respect to the normal.

The backlight may be a Lambertian backlight.

The device may comprise a plurality of pixels.

The observing arrangement may substantially block light in the third range.

The observing arrangement may comprise a directional scatterer for scattering light in the third range.

The first image or sequence of images may be spatially multiplexed with the second image or sequence of images.

In a device according to any aspect of the centres of the first and second ranges may subtend an angle at the device of between 20° and 140°. The centres of the first and second ranges may subtend an angle at the device of less than 130°, of less than 120°, of less than 110°, of less than 100°, or of less than 90°. The centres of the first and second ranges may subtend an angle at the device of greater than 30°, of greater than 40°, of greater than 50°, of greater than 60°, or of greater than 70°. The centres of the first and second ranges may subtend an angle at the device of approximately 80°.

A display of any aspect of the invention may comprise a liquid crystal display.

BRIEF DESCRIPTION OF THE DRAWINGS

Preferred embodiments of the present invention will now be described by way of illustrative example with reference to the accompanying figures in which:

FIG. 6a is a schematic plan view of a multiple view display according to a first embodiment of the present invention;

FIG. 6b is a schematic view of a partially collimated light source;

FIG. 6d shows the angular distribution of intensity produced by the backlight of

FIG. 6c;

FIG. 6e is a schematic view of another directional backlight of the invention;

FIG. 6f is a schematic view of another directional backlight of the invention;

FIG. 6g shows the angular distribution of intensity produced by the backlight of FIG. 6f;

FIG. 7b shows the prism array of the display of FIG. 6a;

FIG. 12a illustrates a multiple view display according to a fourth embodiment of the present invention;

FIGS. 12b and 12c illustrate modifications of the fourth embodiment of the present invention;

FIG. 17a shows the angular distribution of intensity of a backlight suitable for use with the display of FIG. 16a;

FIG. 17b shows the overall angular distribution of intensity obtained by providing the backlight of FIG. 17a in the display of FIG. 16a;

FIG. 18a is a schematic plan view of a backlight having the intensity distribution of FIG. 17a;

FIG. 18b shows the transmissivity of the parallax barrier of the backlight of FIG. 18a;

FIG. 20 is a schematic view of another directional backlight of the invention; and FIG. 21 is a schematic view of another directional backlight of the invention.

DETAILED DESCRIPTION OF THE PREFERRED EMBODIMENTS

The advantage of the present invention are obtained primarily in a dual view display, since the angular separation between the two viewing windows of a dual view display is relative large (typically around 80°). In an autostereoscopic display the lateral separation between the centres of the two viewing windows at the intended viewing distance of the display is equal to the separation between the two eyes of a human, and the angular separation between the two viewing windows is therefore generally much lower than in the case of a dual view display. The invention will therefore be described primarily with reference to a dual view display, but the invention can in principle be applied to other directional displays such as, for example, an autostereoscopic display.

Figure 5A:
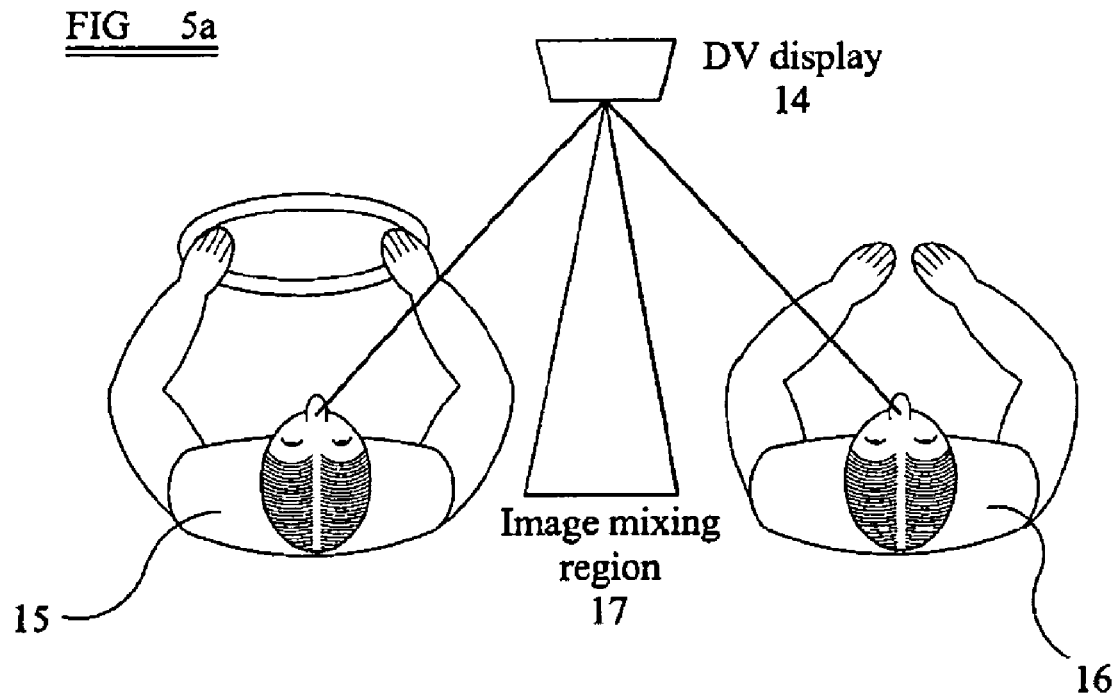
FIG. 5a is a schematic plan view showing a dual-view display installed in a motor vehicle.

In the case of a dual view display intended for installation in a motor car, for example, if a conventional display is used a central rear seat passenger would be located in the image mixing region 17, as shown in FIG. 5a, and so will perceive a mixture of the driver's image and the front passenger's image. This will be irritating, and could cause discomfort. If a display of the invention is used, however, a central rear seat passenger will be located in a 'black window' (a region where the display provides low or zero intensity) between the viewing window of the driver's image and the viewing window of the front passenger's image and so will not perceive cross-talk.

Embodiments of the invention may also be applied to a multi-direction display. A multi-direction display displays a single image at a time, such that the image is visible throughout a first range of directions for a first viewer and a second range of directions for a second viewer. The first and second ranges of directions are generally disposed on opposite sides of the normal to a display surface of the device. The first and second ranges of directions do not overlap with one another, and are generally separated by a third range of directions (which includes the normal direction) in which it is intended that the image is not visible. Such a display may be operated in a time-multiplex manner to provide a directional display. Since the display is not intended to display an image in the third range of directions any output light emitted in the third range of directions is wasted, and it is preferable that the output light from the display is concentrated as much as possible in the first and second ranges.

Figure 1:
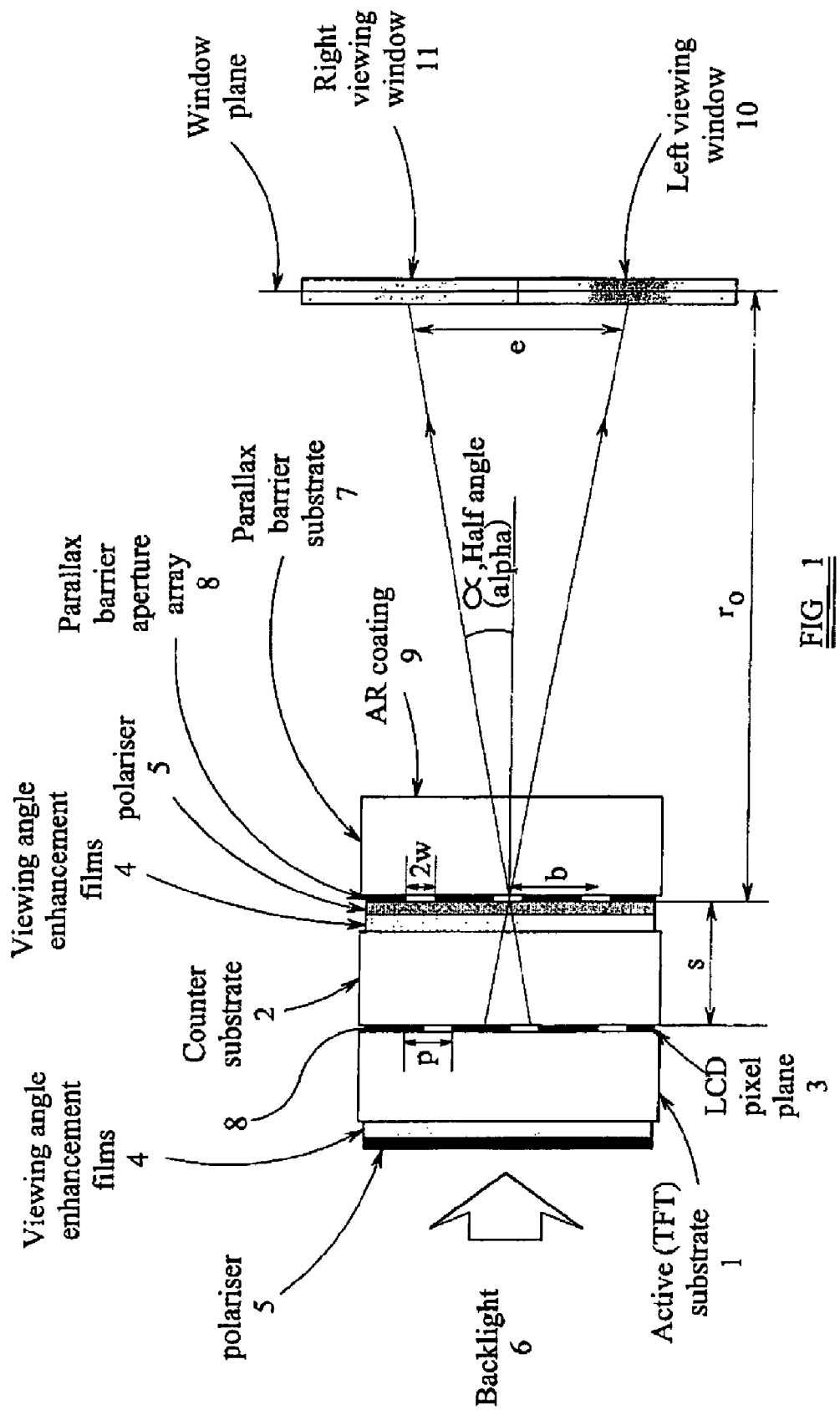
FIG. 1 is a schematic plan view of a conventional front-barrier multiple-view directional display.
Figure 2:
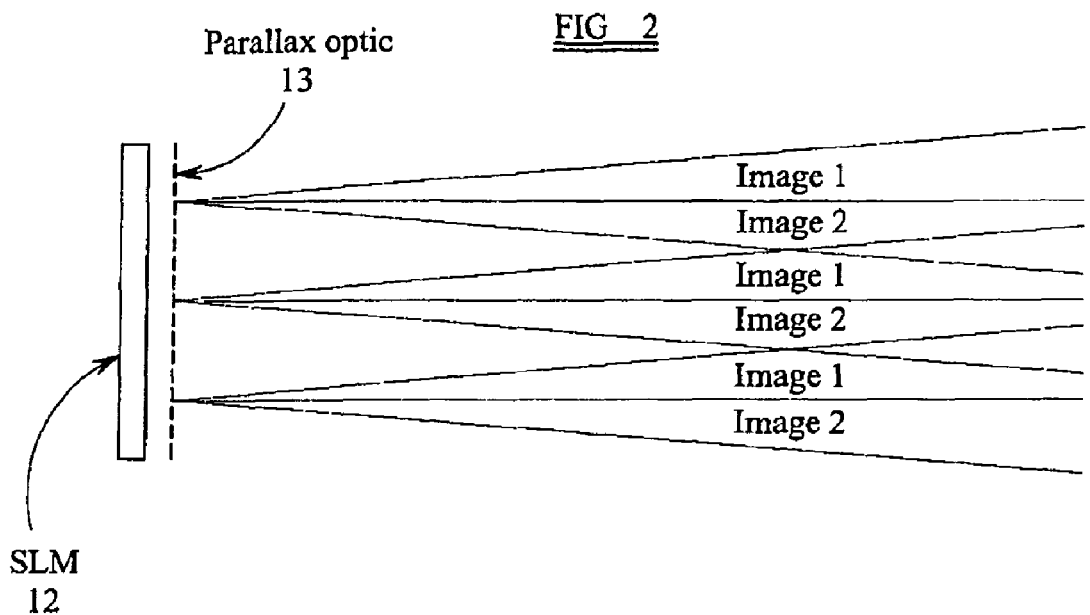
FIG. 2 is a schematic plan view of viewing windows formed by a conventional multiple-view directional display.
Figure 3:
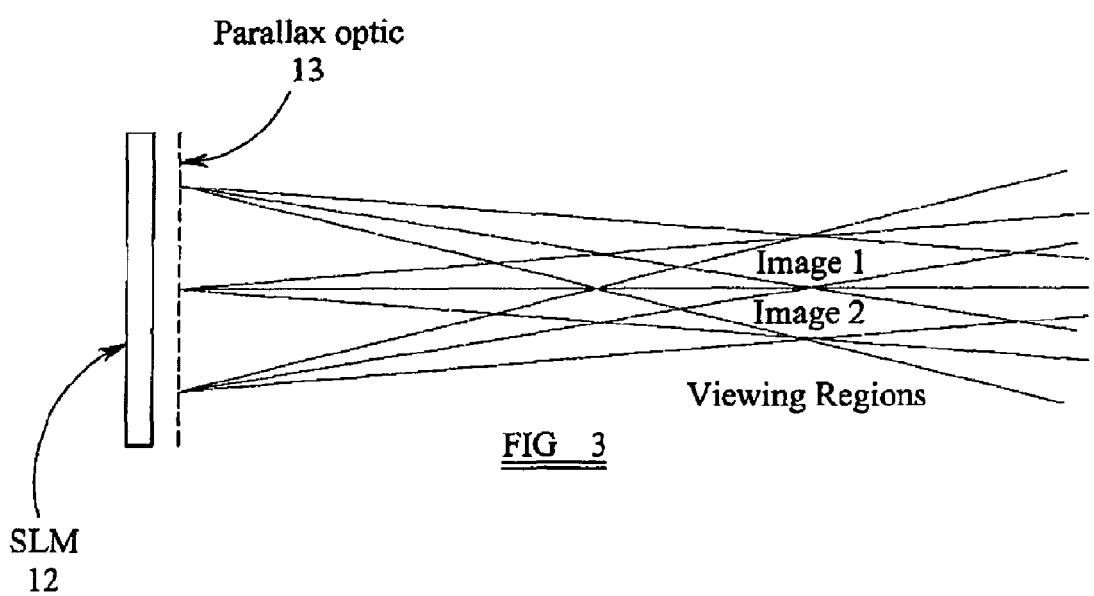
FIG. 3 is a schematic plan view showing viewing windows formed by a multiple-view directional display that incorporates viewpoint correction.
Figure 4:
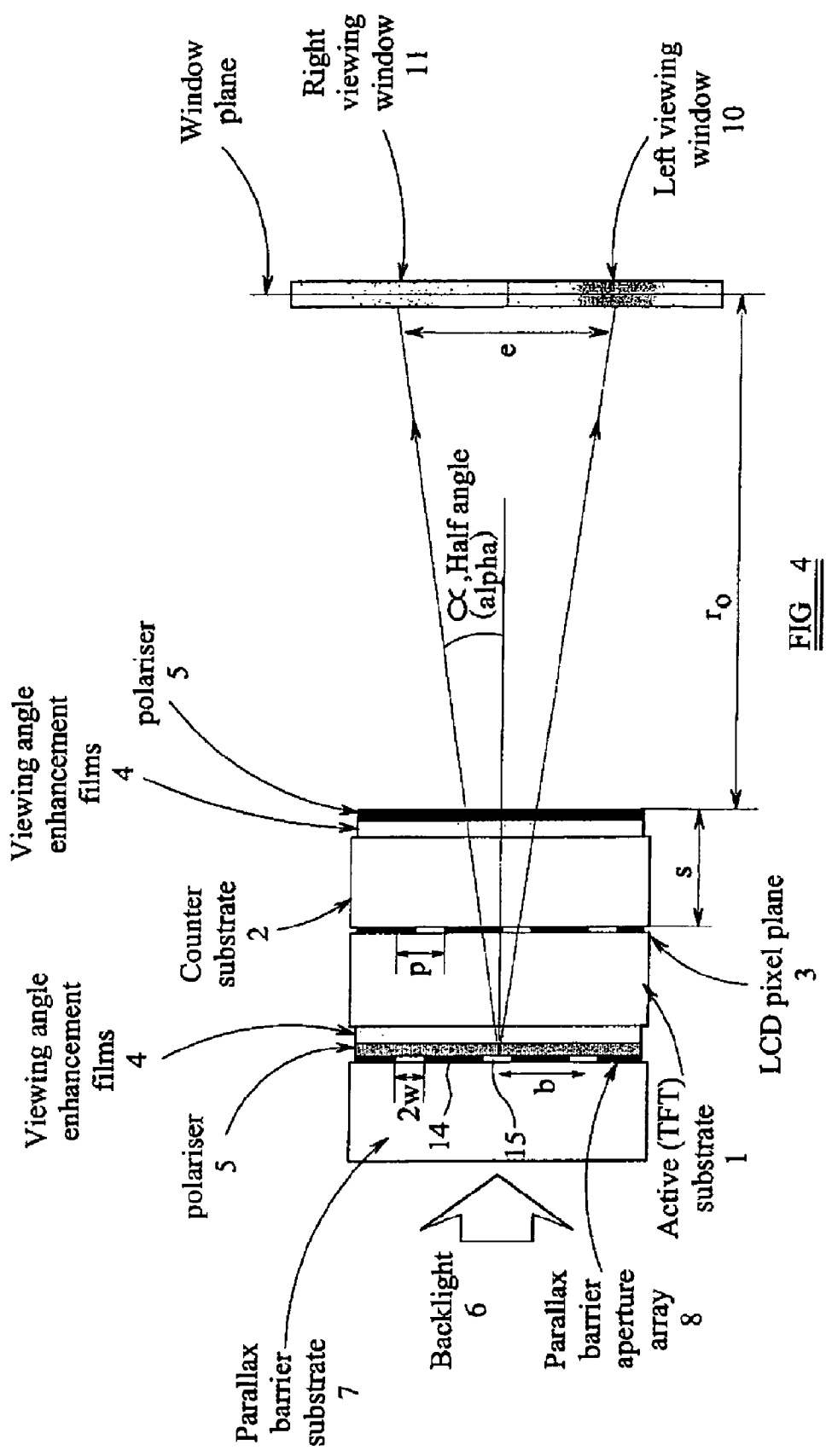
FIG. 4 is a schematic plan view of a rear-barrier multiple view directional display.

FIG. 6a is a schematic plan view of a multiple-view display 18 according to a first embodiment of the present invention. The display 18 comprises a directional display device 19 that is able to display first and second images such that the first image is primarily visible in a first viewing window that covers a first range of directions relative to the device and for displaying a second image that is visible in a viewing window defined by a second range of directions, different from the first range, relative to the device. The first and second images displayed on the directional display device 19 may be still images, or they may be moving images (that is, the first image and second image each consist of a sequence of images). The first and second images may be displayed simultaneously and be spatially multiplexed with each other. The directional display device 19 may be a conventional multiple view directional display that comprises a spatial light modulator for displaying the first and second images and a parallax optic for directing the first and second images into the first and second ranges of direction respectively. Thus, the first image is not visible from the second range of directions and the second image is not visible from the first range of directions. The spatial light modulator may comprise a liquid crystal display layer. The directional display device 19 may have the general form of, for example, the multiple view directional displays shown in FIG. 1 or FIG. 4 of the present application.

As explained above, it will be assumed that the directional display device 19 is a dual view display and that the first and second displayed images are intended to be viewed by first and second observers.

The multiple view display 18 of FIG. 6a further comprises a directional backlight 20. The directional backlight directs light through the directional display device 19 at least mainly in the first and second ranges of directions. When the display 18 is viewed by an observer from the first range of directions, or from the second range of directions, the observer will see a bright image. This is because light from the backlight 20 is directed primarily along the directions in which the display 18 is viewed. The directional backlight 20 is preferably arranged so that the display 18 emits little or no light along a direction normal to the display face of the display. This ensures that as much as possible of the light generated by the directional backlight 20 is emitted into the first and second ranges so that the first and second images are displayed with as great an intensity as possible. It also provides a 'black window' between the first and second ranges of directions.

In the embodiment of FIG. 6a, the first range of directions subtends an angle, at the display 18, of 2 alpha, and the second range of directions subtends an angle at the display of 2 beta. The first and second ranges are on opposite sides of the normal to the display face 19a of the device and may be, as in this embodiment, substantially symmetrical with respect to the normal to the display face of the display. The first range and the second range are separated by a third range, which includes the normal to the display.

The directional backlight 20 comprises a light source 21 and an optical arrangement 22 for directing light into the first and second ranges. In this embodiment the light source 21 is a source of partially collimated light, and generates an output beam that has its greatest intensity at directions along, or close to, a the normal to the display face of the display 18.

FIG. 6b is a schematic perspective view of the light source 21 showing its components separated for clarity. As can be seen, the light source 21 comprises a waveguide 23, with first and second light sources 24, 25 arranged along opposite side edges of the waveguide. Light emitted by the light sources 24, 25 passes into the waveguide 23, undergoes internal reflection within the waveguide 23 since the waveguide 23 has a greater refractive index than its surroundings, and finally passes out of the front face 23a of the waveguide. A reflector 26 is preferably positioned behind the waveguide 23, so that any light that is emitted from the rear face of the waveguide 23 is reflected back to the waveguide 23 and is not lost.

Light emitted from the front face 23a of the waveguide 23 is collimated by two collimating structures 27, 28. Each structure comprises a flat plate, provided on their front surface with an array of prisms. The prisms of one structure 27 extend generally perpendicular to the prisms of the second structure 28.

The partially collimated light source 21 shown in FIG. 6b is described in, for example, 'Highly efficient backlight for liquid crystal display having no optical films', Applied Physics Letters, Vol. 83, No. 13, p 215 (2003), to which attention is directed. FIG. 7a shows the angular distribution of intensity provided by the light source 21 of FIG. 6b. It will be seen that the intensity is greatest along the direction of the light beam, and falls to a minimum in the range of from approximately ±40° to ±60° from the direction of the light beam. The intensity then rises to a subsidiary peak at an angle of approximately ±75° from the direction of the light beam.

The optical arrangement 22 of the display 18 of FIG. 6a directs light from the light source 21 such that the light is directed in primarily the first and second ranges of directions. One suitable structure for the optical arrangement is a prism structure 22, and this is shown in more detail in FIG. 7b. The prism structure 22 comprises a base plate 23', and an array of prisms 24' provided on a surface of the base plate 23'. In use, the prism structure 22 is oriented such that light from the light source 21 is incident on the prism array 24'. Light propagating along the axis of the display 18 that is incident on the prism array 24' is split by the prism array, and is directed primarily along the first and second ranges of directions. This is shown by ray paths 29a and 29b in FIG. 7b.

The prism array 24' and base plate 23' are made of a material that has a refractive index higher than the refractive index of the surrounding materials. The prism angle gamma of the prisms is chosen depending on the desired angular direction of the light leaving the prism structure 22. Where the invention is applied to a dual view display, it is likely that the first and second ranges will be centred on angles in the approximate ranges of from 30° to 40° and from −30° to −40° from the axis of the display. The prism angle is preferably in the range of from 70° to 110°, and is particularly preferably approximately 90°. The refractive index of the prism array 24' and the base plate 23' is preferably in the range of from 1.3 to 1.8 and is particularly preferably approximately 1.5. In one particularly preferred embodiment, the prism array had a refractive index of approximately 1.5, and it was found that a prism angle of 83°. produced the greatest angular extent of the black window. The prism angle that produces the greatest angular extent of black window will depend on the angular distribution of intensity from the backlight, but for most backlights a prism angle of around 90° will produce a well-defined black window.

Figure 7A:
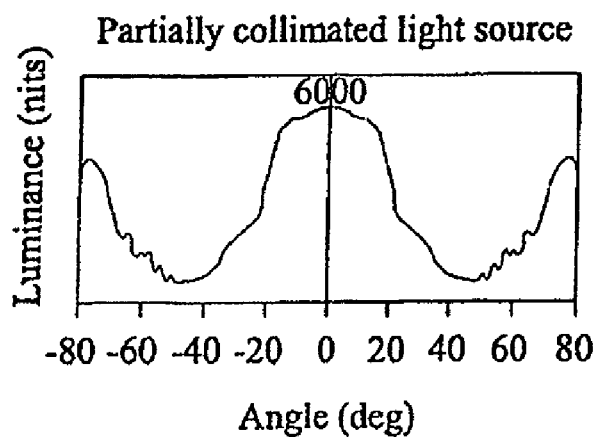
FIG. 7a shows the angular distribution of intensity produced by the backlight of FIG. 6b.
Figure 7B:
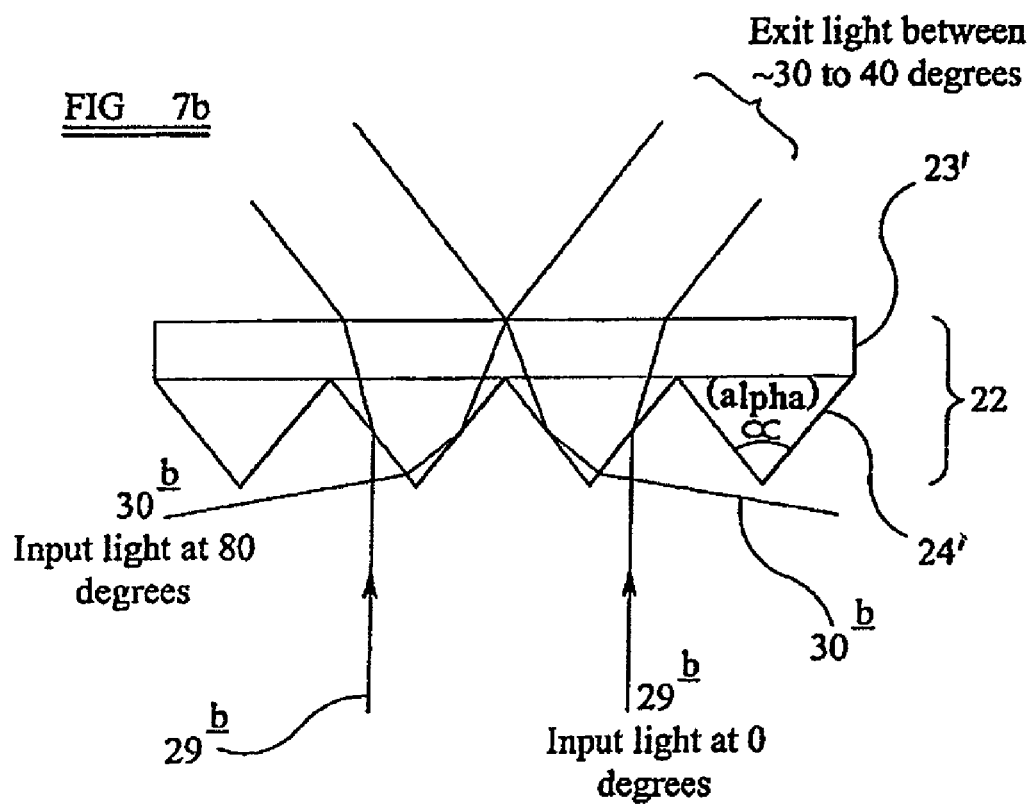

Although the prism array 24' and the base plate 23' are shown as separate components in FIG. 7b they are in practice preferably integral with one another. The prism structure 22 may be formed by, for example, a moulding process.

In the embodiment of FIG. 6a, the light source 21 provides partially collimated light having the intensity profile shown in FIG. 7a. This embodiment is particularly advantageous, because light propagating at an angle of approximately ±75° to ±80° to the normal of the display, corresponding to the subsidiary peak in the intensity spectrum of FIG. 7a, is also directed into the first and second ranges by the prism array. This is shown by the light paths 30a and 30b in FIG. 7b. Light travelling along these paths is incident on one angled face of a prism of the array and is transmitted into the prism with refraction, undergoes internal reflection at the adjacent angled face of the prism, and finally leaves the prism structure 22 via the rear face of the base plate 23' where it undergoes further refraction. The result of the refraction, reflection and refraction steps is that light incident on the prism structure 22 at an angle of approximately ±80° to the axis is directed into the first or second ranges. Thus, light from both the principal intensity peak in the spectrum of FIG. 7a centred on an angle of 0°, and light from the subsidiary intensity peaks at approximately ±75° is all directed into the first or second ranges—that is, towards the intended viewing positions of the display.

The use of a source of partially collimated light is therefore preferable, since this provides bright images. In principle, however, this embodiment of the invention is not limited to a source of partially collimated light.

Figure 5B:
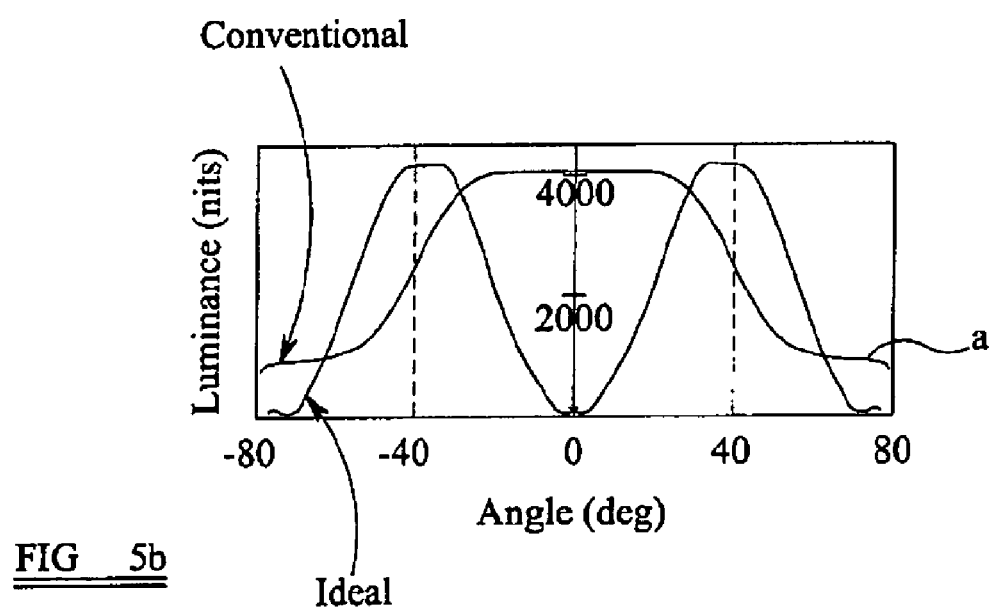
FIG. 5b shows the angular variation of intensity of a conventional liquid crystal display panel.

The backlight 20 of FIG. 6a has an output intensity profile similar to the ideal profile shown in FIG. 5b—the light is directed primarily into first and second ranges of directions, and the first and second ranges of directions are separated by a third range of directions in which little or no light is directed. The centres of the first and second ranges preferably subtend an angle at the device of between 20° and 140°. They may subtend an angle at the device of less than 130°, of less than 120°, of less than 110°, of less than 100° or of less than 90°. They may subtend an angle at the device of greater than 30°, of greater than 40°, of greater than 50°, of greater than 60° or of greater than 70°. They may subtend an angle at the device of approximately 80°.

In FIG. 7b the prisms are shown as having a constant pitch over the prism structure 22. It is, however, possible to change the pitch of the prisms randomly over the prism structure, and this would have the advantage of reducing the generation of Moiré effects that could occur if the prisms have a uniform pitch over the prism structure 22 as a result of alignment between the prisms and other components of the display that have a regular pitch.

Figure 7C:
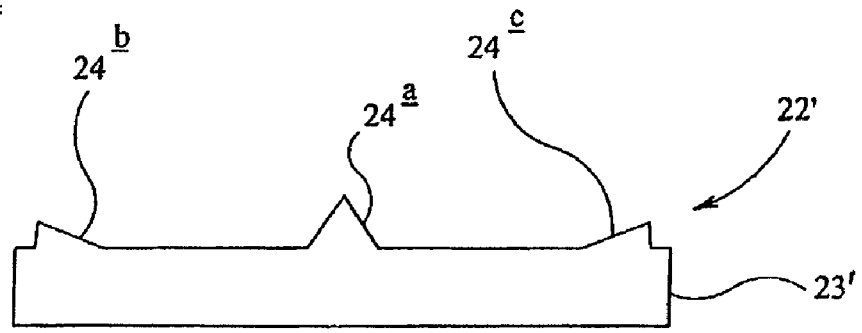
FIG. 7c shows an alternative prism structure.

Additionally or alternatively, the prism angle may change across the display as shown schematically in FIG. 7c which shows an alternative prism structure 22' suitable for use in the directional backlight of 6a. A prism 24a in the centre of the structure has a symmetric section (the section is generally an isosceles triangle).

However, the section of the prisms, and the prism angle, change away from the centre of the prism structure, as shown by prisms 24b,24c. The widths of the base of the prisms 24a, 24b, 24c are substantially equal to one another, so that the change in the prism section leads to a reduction in the height of the prism. The change of the prism angle across the display provides 'viewpoint correction'.

Figure 7D:
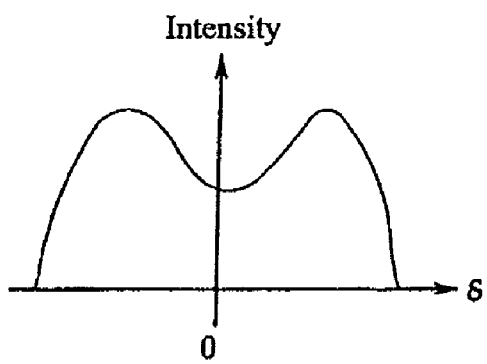
FIG. 7d shows the angular distribution of intensity according to another backlight of the invention.

The prism structure 22 may also be arranged to provide only partial re-direction of light away from directions close to the normal to the display face. This embodiment provides an output intensity profile that provides increased intensity at the intended viewing directions but that has a non-zero intensity at the normal to the display face, as shown in FIG. 7d. This embodiment may be used in a display that is intended to be viewed along the normal direction such as, for example, a display that is switchable between a multiple view directional display mode and a standard two-dimensional display mode, and it may also be used in a conventional two-dimensional display.

Figure 6C:
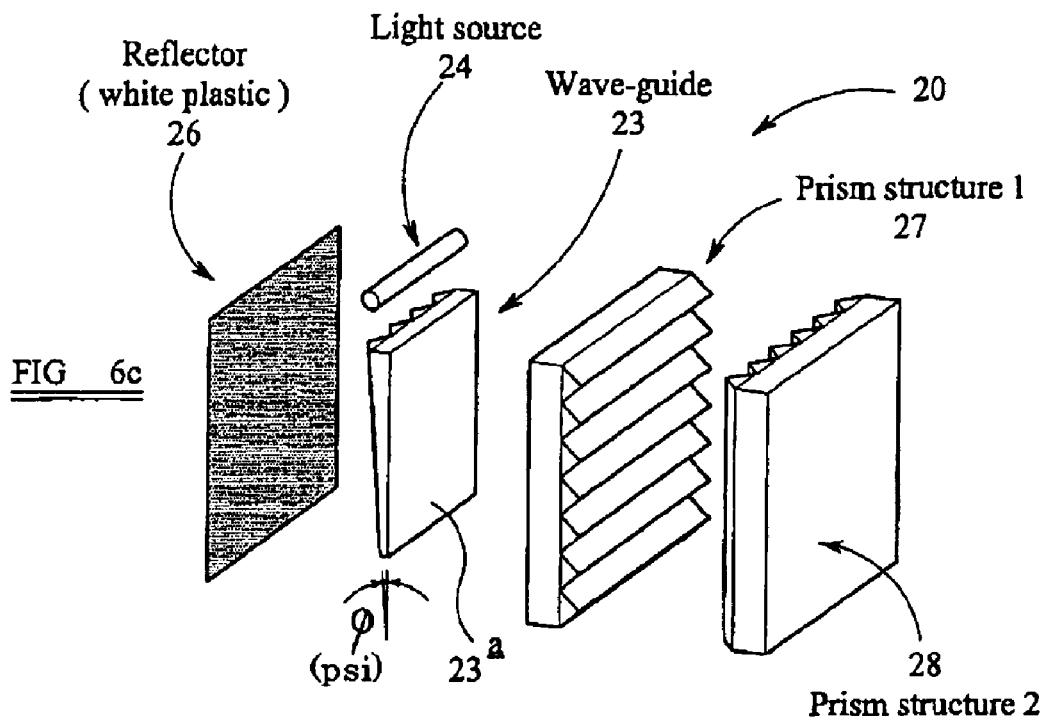
FIG. 6c is a schematic view of a directional backlight of the invention.

FIG. 6c shows another directional backlight 20 of the invention, with the components shown separated for clarity. The directional backlight 20 comprises a waveguide 23, with one or more light sources arranged along respective side edges of the waveguide (one light source is shown in FIG. 6c, but the backlight is not limited to exactly one light source). Light emitted by the light source(s) passes into the waveguide 23, undergoes internal reflection within the waveguide 23 since the waveguide 23 has a greater refractive index than its surroundings, and finally passes out of the front face 23a of the waveguide. A reflector 26 is preferably positioned behind the waveguide 23, so that any light that is emitted from the rear face of the waveguide 23 is reflected back to the waveguide 23 and is not lost. The reflector 26 may be, for example, a sheet of material with a high reflectivity to visible light such as a white plastics material.

Two prism structures 27,28 are provided in front of the waveguide 23. Each structure comprises a flat plate, provided on one surface with an array of prisms. The prisms of one structure 27 extend generally perpendicular to the prisms of the second structure 28. The first prism structure 27 has the prism array provided on its front surface, whereas the second prism structure 28 has the prism array provided on its rear surface, so that the two prism arrays face one another.

A further prism array is provided on the rear face of the waveguide 23. The prisms provided on the rear face of the waveguide 23 preferably extend generally perpendicular to the prisms of the first prism structure 27.

In operation, the prisms provided on the rear face of the reflector 23 impart a degree of collimation on light emitted from the front face of the waveguide 23. The prisms of the first prism structure 27 serve to further collimate the light emitted from the waveguide 23. The reflector 26, waveguide 23, light source 24 and first prism structure 27 therefore constitute a partially collimated light source, corresponding to the partially collimated light source 21 of FIG. 6a.

The second prism structure 28 forms an optical arrangement for directing light into first and second angular ranges, and corresponds to the optical arrangement 22 of FIG. 6a. The reflector 26, waveguide 23, light source 24 and first and second prism structures 27,28 therefore constitute a directional backlight. The backlight may be used to illuminate a display panel, which may be a conventional display panel or a directional display panel, in the manner shown in FIG. 6a.

Compared to the partially collimated light source of FIG. 6b, the partially collimated light source of FIG. 6c has one fewer component since one of the collimating prism structures of FIG. 6b is incorporated into the waveguide 23 in FIG. 6c.

In FIG. 6c, the prisms provided on the rear face of the reflector 23 are shown as being inclined—that it, the apex ridge of a prism is not parallel to the front face of the waveguide but is at an angle psi to the front face of the waveguide. This prevents the generation of Moiré fringes. The angle of inclination of the apex ridge may be, for example, psi=10°.

The prisms of the two prism structures 27, 28 in FIG. 6c, and the prism arrays in FIGS. 6a and 6b may also be inclined as shown for the prisms provided on the rear face of the reflector 23.

Figure 6D:
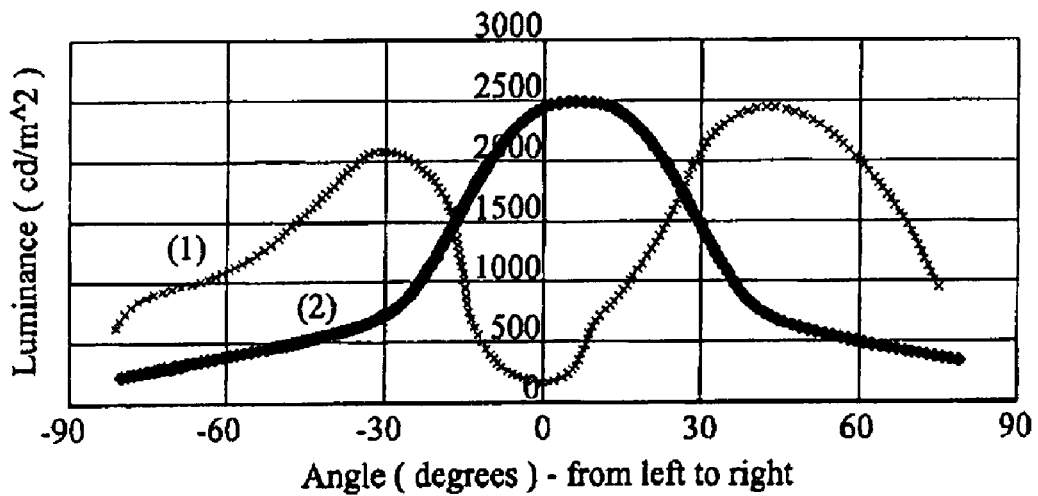

FIG. 6d show, as trace (1) the intensity profile produced by the directional backlight of FIG. 6c. The intensity profile produced by a conventional prism backlight is shown as trace (2), for comparison. It will be seen that trace (1) has a maximum intensity at angles of approximately ±30° from the normal axis of the backlight. The peak intensity is approximately 12 times greater than the intensity along the normal axis. The results of FIG. 6d were obtained for a backlight having only one light source 24 adjacent the waveguide 23.

FIG. 6e is a schematic view of another directional backlight 20 of the invention, with the components shown separated for clarity. The directional backlight 20 of FIG. 6e comprises a waveguide 23, one or more light sources arranged along respective side edges of the waveguide (one light source 24 is shown in FIG. 6e, but the backlight is not limited to this), a reflector disposed behind the waveguide 23, and two prism structures 27,28 disposed in front of the waveguide 23. The waveguide 23, light source 24, reflector 26, and prism structures 27,28 correspond to those of the directional backlight 20 of FIG. 6c, and their description will not be repeated. The backlight 20 of FIG. 6e may be used to illuminate a display panel, which may be a conventional display panel or a directional display panel, in the manner shown in FIG. 6a.

The directional backlight 20 of FIG. 6e further comprises a third prism structure 66. The third prism structure 66 has the prism array provided on its rear surface; the prisms extend generally perpendicular to the prisms of the second prism structure 28.

The second and third prism structures 28,66 form an optical arrangement for directing light into angular ranges. The second prism structure 28 directs light output by the first prism structure (which will be partially collimated) into two angular ranges disposed on opposite lateral sides of the normal axis, and the third prism structure 66 directs light into angular ranges disposed above and below the normal axis. Thus, the directional backlight 20 of FIG. 6e directs light into four angular ranges that are located respectively: above and left of the normal axis; above and right of the normal axis; below and left of the normal axis; and below and right of the normal axis. The backlight of FIG. 6e is of particular use in a multiple view display in which the display device can display four separate views intended for display by four different observers.

FIG. 6f shows another directional backlight 20 of the invention, with the components shown separated for clarity. As in the backlight of FIG. 6b, the backlight 20 has a light source 21 for generating partially collimated light and an optical arrangement 22 for directing the light into two angular ranges. The light source 21 comprises a waveguide 23, with one or more light sources arranged along respective side edges of the waveguide (two light sources 24, 25 arranged along opposite side edges of the waveguide are shown in FIG. 6f, but the backlight is not limited to this). Light emitted by the light sources passes into the waveguide 23, undergoes internal reflection within the waveguide 23 since the waveguide 23 has a greater refractive index than its surroundings, and finally passes out of the front face 23a of the waveguide. A reflector 26 is preferably positioned behind the waveguide 23, so that any light that is emitted from the rear face of the waveguide 23 is reflected back to the waveguide 23 and is not lost. Light emitted from the front face 23a of the waveguide is collimated by two prism structures 27,28. The waveguide 23, the light sources 24, 25, the reflector 26 and the prism structures 27,28 of FIG. 6f correspond to those in FIG. 6b, and their description will not be repeated. Also, the optical arrangement 22 of FIG. 6f corresponds to the optical arrangement 22 of FIG. 6a and its description will not be repeated. The backlight 20 of FIG. 6f may be used to illuminate a display panel, which may be a conventional display panel or a directional display panel, in the manner shown in FIG. 6a.

The backlight 20 of FIG. 6f further comprises a diffuser 67 disposed between the waveguide 23 and the first prism array 27. The diffuser diffuses the light emitted from the front face of the waveguide. The diffuser 67 is uniformly diffusing, or is substantially uniformly diffusing, over its area.

The waveguide 23 is provided with diffusive structures (not shown) on one or both of its front and back surfaces to allow light propagating within the waveguide to escape from the waveguide. When the backlight is used to illuminate a display panel it can sometimes happen that the diffusive structures of the waveguide are visible to an observer viewing the display panel, and this degrades the quality of the image. Providing the diffuser 67 prevents the diffusive structures of the waveguide being visible to an observer.

FIG. 6g shows, as trace (1) the intensity profile produced by the directional backlight of FIG. 6f. The intensity profile produced by a conventional prism backlight is shown as trace (2), for comparison. It will be seen that trace (1) has a maximum intensity at angles of approximately ±45° from the normal axis of the display. The peak intensity is approximately 9 times greater than the intensity along the normal axis. The results of FIG. 6f were obtained for a backlight having two light sources 24,25 adjacent the waveguide 23.

Figure 6H:
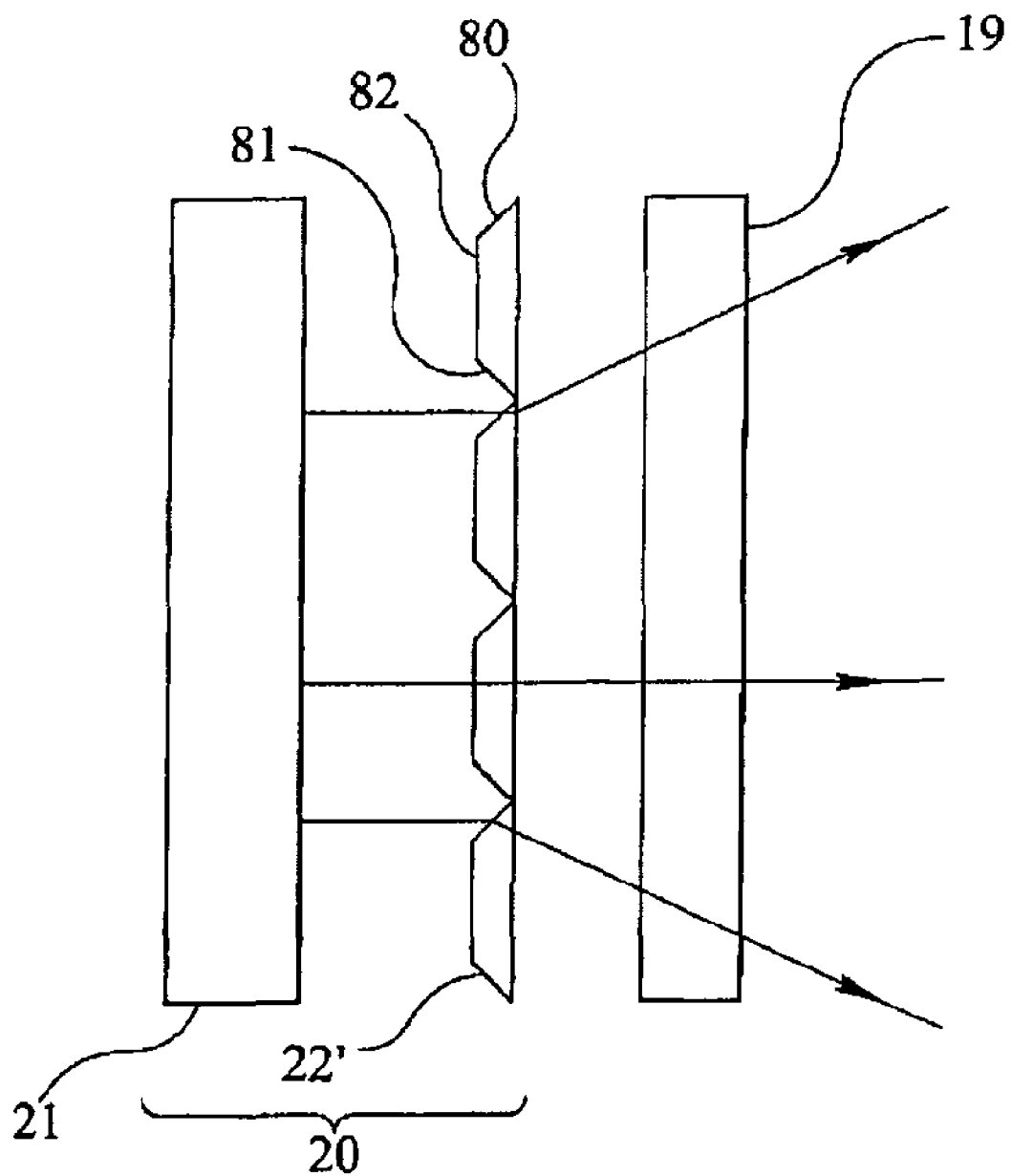
FIG. 6h is a schematic plan view of another directional backlight of the invention incorporated in a display.

FIG. 6h shows a further directional backlight 20 of the invention incorporated in a display 18. The directional backlight comprises a partially collimated light source 21 and an optical arrangement 22' for directing light from the partially collimated light source into first and second ranges of directions. Any suitable partially collimated light source may be used in the directional backlight 20 of FIG. 6h such as, for example, one of the partially collimated light sources described above or one of the partially collimated light sources to be described below.

The display 18 further comprises a display device 19 arranged in the path of light from the directional backlight. The display device 19 may be a directional display device such as, for example, a dual view display device, or it may be a conventional display device.

The optical arrangement 22' comprises a prism array 22'. In contrast to the embodiment of FIG. 6a, the prism array 22' of FIG. 6h is an array of truncated prisms. A prism of the array thus comprises two surfaces 80,81 that are inclined with respect to the axis of the display (hereinafter the 'inclined surfaces'), and a third surface 82 that is substantially perpendicular to the axis of the display (hereinafter the 'perpendicular surface'). Light that is incident on one of the inclined surfaces of a prism is deviated, and is directed into the first range of directions or the second range of direction. Light that is incident on the perpendicular surface 82 is however not significantly deviated.

The prism array 22' of FIG. 6h thus provides only partial re-direction of light away from directions close to the normal to the display face. The directional backlight of this embodiment provides an output intensity profile that provides increased intensity at the intended viewing directions but that has a non-zero intensity at the normal to the display face, and has output intensity profile that is similar to the profile shown in FIG. 7d. The directional backlight of this embodiment may be used in a display that is intended to be viewed along the normal direction such as, for example, a display that is switchable between a multiple view directional display mode and a standard two-dimensional display mode, and it may also be used in a conventional two-dimensional display.

The on-axis intensity of the backlight of FIG. 6h is determined by the ratio between, on the one hand, the width, perpendicular to the axis, of the perpendicular surface 82 of a prism of the prism array and, on the other hand, the width, perpendicular to the axis, of the inclined surfaces 80,81 of a prism of the prism array 22'.

The prisms of the prism array 22' may be mounted on a suitable base plate (not shown), as described above with reference to, for example, FIG. 7b. Alternatively, the prism array may be manufactured by a moulding process. The prism angle (here defined as the angle that the inclined surfaces would make with one another, if they were extended to meet) and the refractive index of the prisms are preferably as described above with reference to FIG. 7b.

Figure 8:
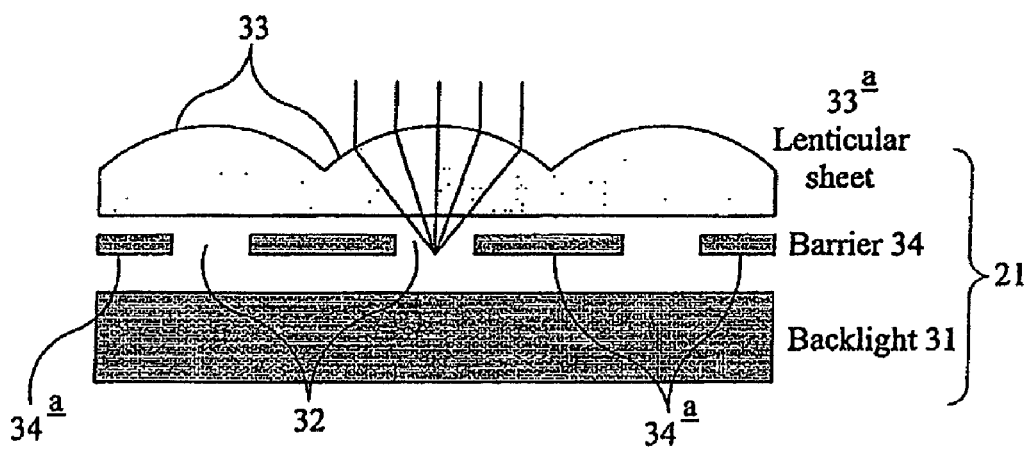
FIG. 8 is a schematic plan view of another partially collimated light source.

FIG. 8 is a schematic plan view of another partially collimated light source 21 that is suitable for use in the display of FIG. 6a or the directional backlight of FIG. 6e. In this embodiment the light source 21 comprises a backlight 31 that emits light substantially uniformly over its area. The backlight 31 may for example comprise a waveguide and light sources disposed along opposite side edges of the waveguide, as shown in FIG. 6*b*.

The light source comprises a plurality of imaging elements 33. In the embodiment of FIG. 8 the imaging elements 33 constitute a lenticular sheet 33*a*, but the imaging elements are not limited to a lenticular sheet. The light source 21 further comprises a barrier 34 having a plurality of transmissive regions or apertures 32 that are aligned with the imaging elements. The apertures 32 are separated by regions 34*a* that do not transmit light. In general, the lens will have a generally semi-cylindrical shape and extend into the plane of the paper, and the transmissive regions 32 and opaque regions 34 will be in the form of strips that extend into the plane of the paper. Light that passes through the apertures 32 is at least partially collimated by the imaging elements 33 so that the light source outputs a beam of at least partially collimated light. The degree of collimation of the output light will depend on the imaging power of the imaging elements, the distance between the imaging elements and the barrier 34, the width of the transmissive regions 32, the pitch of the transmissive regions 32, and the pitch of the imaging elements.

The opaque regions 34*a* of the barrier are preferably reflective, so that light incident on an opaque region 34*a* is reflected back into the backlight 31. The light may then be re-reflected out of the backlight 31, and pass through a transmissive aperture 32.

The pitch of the barrier is preferably not an exact integral multiple of the pitch of the imaging elements, to provide the 'viewpoint correction' effect mentioned earlier.

The opaque regions 34*a* of the barrier may be incorporated in the backlight 31. Where the backlight is a backlight with a waveguide as shown in FIG. 6*b*, for example, the opaque regions 34*a* of the barrier may be provided on the surface of the waveguide by any suitable deposition, printing or stamping technique.

The barrier may alternatively constitute a liquid crystal layer that is suitably addressed to define the opaque regions 34*a* of the barrier. This would provide a barrier that can be switched OFF by addressing the liquid crystal layer so that it is uniformly transparent over its area. This provides a backlight that can be switched between a directional backlight mode (when the barrier is defined in the liquid crystal layer) and a conventional backlight mode (when the barrier is OFF).

If the barrier is defined in a liquid crystal layer, it is further possible to 'move' the opaque regions 34*a* of the barrier laterally with respect to the imaging elements by re-addressing the liquid crystal layer. This alters the angular positions at which the backlight provides maximum intensity, and this may be of advantage in a display in which the angular positions of the viewing windows can be altered to track the movement of an observer using any of the known so-called 'observer tracking' techniques.

FIG. 8 shows only the principal components of the light source 21. In a practical embodiment extra components such as, for example, a diffuser placed in front of the backlight 31 may be present.

Figure 9:
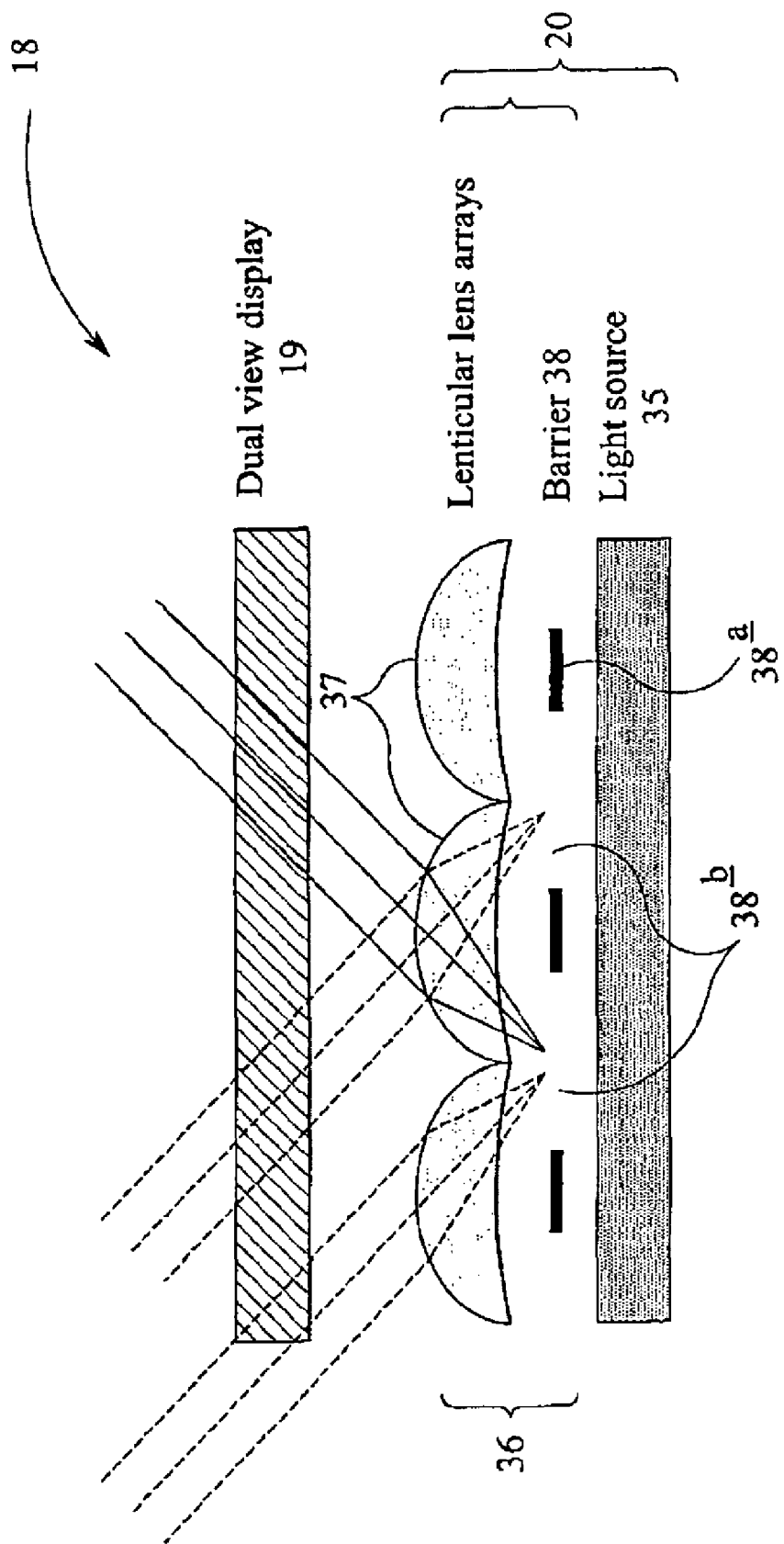
FIG. 9 shows a multiple view display according to a second embodiment of the present invention.

FIG. 9 is a schematic plan view of a multiple view display 18 according to a second embodiment of the present invention. The display 18 again comprises a directional display device 19, in this embodiment a dual view display, that can display a first image so as to be mainly visible from a first range of directions relative to the device and to display a second image so as to be mainly visible from a second range of directions (different from the first range) relative to the device. The directional display device 19 is illuminated by a directional backlight 20 that directs light through the directional display device 19 at least mainly in the first and second ranges.

As in the embodiment of FIG. 6*a*, the directional display device 19 may be any conventional directional display, and will not be described further.

The directional backlight 20 of this embodiment comprises a light source 35 that emits light generally uniformly over its entire area. An optical arrangement for directing light from the light source 35 primarily in the first and second directions is provided in front of the light source 35. The arrangement 36 comprises an array of imaging elements 37. In this embodiment the imaging elements 37 constitute a lenticular lens array, but the invention is not limited to this particular form for the imaging elements 37.

A barrier 38 is disposed between the light source 35 and the imaging elements 37. The barrier 38 contains regions 38*a* that are opaque to light and regions 38*b* that are transmissive to light from the light source. The imaging elements 37 extend into the plane of FIG. 9, and the transmissive region 38*b* and opaque regions 38*a* of the barrier 38 extend into the plane of the paper in the form of transmissive strips or opaque strips.

The array of imaging elements is substantially aligned with the opaque regions 38*a* of the barrier so as to prevent, or substantially prevent, light from being directed between along, or close to, the normal direction to the display surface of the display. One opaque region 38*a* of the barrier is aligned with the axis of each imaging element 37. Thus, all light that is incident on the imaging element 37 is incident on the off-axis portions of the imaging elements, and so is directed by the imaging elements 37 in an off-axis direction. Thus the output from the backlight 20 contains little or no light directed along the axis of the display, and substantially all light emitted by the backlight 20 is directed in off-axis directions. The imaging power of the imaging elements 37, the separation between the imaging elements 37 and the barrier 38, and the width and pitch of the apertures 38*b* of the barrier are chosen so that the directions in which the backlight emits light are coincident with the first and second ranges in which the directional display device 19 displays the first and second images. As in the embodiment of FIG. 6*a*, the first and second ranges, in which the display 18 displays the first and second images, are separated by a third range of directions which includes the normal direction. The backlight is arranged to direct substantially no light into at least part of the third range of directions.

The opaque regions 38*a* of the barrier 38 may be reflective, so that light incident on the opaque regions 38*a* is reflected back into the light source 35. The light may then be re-emitted, and can pass through a transmissive region 38*b* of the barrier.

In some applications of a multiple-view display it may be desirable if some light is emitted in the normal direction. For example, where a dual view display is intended for use in a motor vehicle, it may be desirable to provide a third display for a rear-seat passenger, and this view may be directed in substantially the normal direction. If it is desired that some light is emitted in the normal direction, the directional backlight 20 of FIG. 9 may be modified by replacing the opaque regions 38*a* of the barrier by semi-opaque regions. Some light will then pass through the semi-opaque regions, and the backlight 20 will emit some light along the axis of the display 18. Alternatively, the opaque barrier strips 38*a* may be replaced by regions that are semi-reflective and semi-transmissive.

Figure 10:
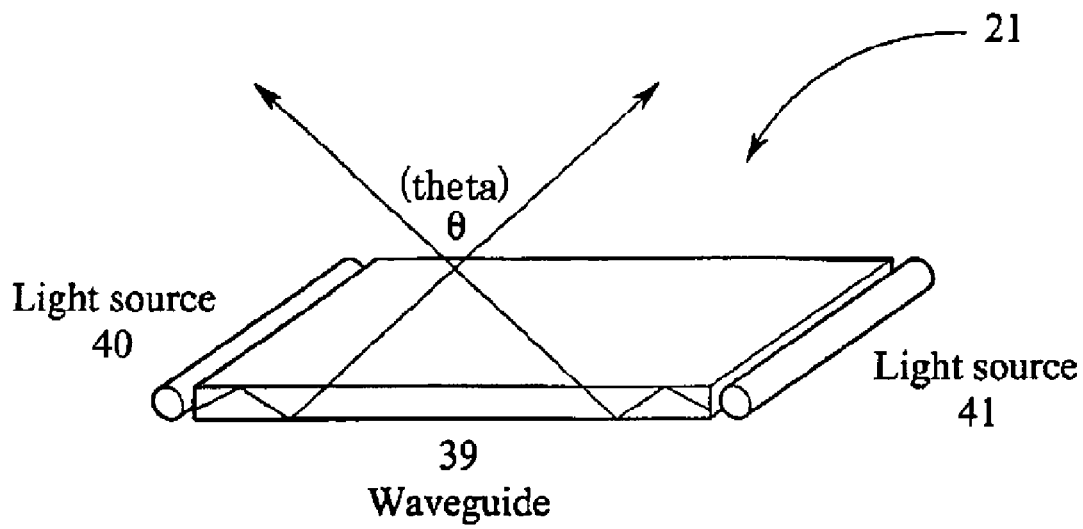
FIG. 10 is a schematic perspective view of a backlight for use in a multi-direction display according to a third embodiment of the present invention.

FIG. 10 shows another directional backlight 20 suitable for use in a multiple view display of the present invention. The backlight comprises a waveguide 39 and first and second light sources 40, 41. Each light source is arranged along one side edge of the waveguide. Light emitted by the light sources 40, 41 is transmitted through the respective side edge of the waveguide, and propagates through the waveguide. The waveguide 39 has a greater refractive index than its surroundings and light initially undergoes internal reflection at the front and rear surfaces of the waveguide 39 until it is eventually incident on the front surface of the waveguide at an angle less than the critical angle and is emitted from the front face of the waveguide.

Figure 11:
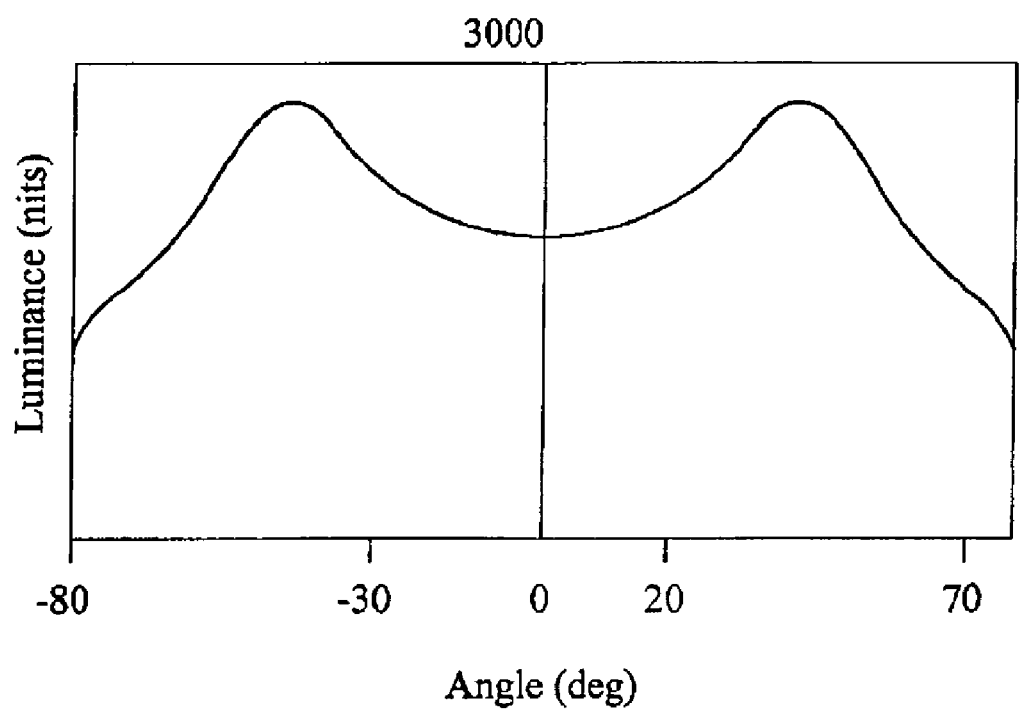
FIG. 11 illustrates the angular distribution of intensity provided by the backlight of FIG. 10.

The light sources 40, 41 are arranged along the left and right side edges of the waveguide 39, with the terms 'left' and 'right' referring to how the components are perceived when viewed by an observer looking at the display. FIG. 11 shows the intensity of the backlight 21 of FIG. 10 as a function of the lateral angular displacement from the normal, and it will be seen that the intensity contains two maxima, one either side of the normal to the display. The angles at which the intensity maxima occur are determined by the width and thickness of the waveguide, and by the difference between the refractive index of the waveguide and the refractive index of the surrounding material. The directional backlight 21 of FIG. 10 is therefore suitable for use in a multiple view display of the present invention—by arranging the backlight to illuminate a directional display such that the angular position of one maximum in the output intensity of the backlight lies within the first range of directions (in which the directional display device displays the first image) and such that the angular position of the second maximum in the output intensity of the backlight lies within the second range of directions (in which the directional display displays a second image), it is possible to increase the brightness of the displayed first and second images.

It will be noted, however, that the output intensity of the backlight 21 of FIG. 10 is not close to zero for directions near the normal direction, but is approximately 70% of the maximum intensity. This means that the backlight 21 of FIG. 10 is not suitable for use in a multiple view display that is desired to provide a dark display in the normal direction. The backlight 21 of FIG. 10 is, however, suitable for use in a multiple view display that provides three or more images, or in a multiple view display that can be switched to give a conventional two-dimensional display mode.

The backlight 21 of FIG. 10 may also be used in a time-multiplexed multiple view directional display. This may be done by incorporating the backlight of FIG. 10 in a display that also comprises a display device for displaying a single image at a time, which image is visible throughout a range of directions including first and second ranges for first and second viewers, the first and second ranges being disposed on opposite sides of and spaced from the normal to a display surface of the device. The display device may be any suitable display device, and may be a liquid crystal display device. Again, the angular position of the maxima in the output intensity of the backlight are arranged such that one maximum in the output intensity of the backlight lies within the first range of directions and such that the angular position of the second maximum in the output intensity of the backlight lies within the second range of directions. The intensity maxima in the output intensity of the backlight preferably subtend an angle at the device of between 20° and 140°. They may subtend an angle at the device of less than 130°, of less than 120°, of less than 110°, of less than 100° or of less than 90°. They may subtend an angle at the device of greater than 30°, of greater than 40°, of greater than 50°, of greater than 60° or of greater than 70°. They may subtend an angle at the device of approximately 80°. The position of the minimum in the output intensity of the backlight is arranged to be substantially coincident with the normal to a display face of the display.

To operate this display as a time multiplex directional display the backlight is switched between one mode in which light is primarily directed in the first range of directions and another mode in which light is primarily directed in the second range of directions. This is done by switching the light sources 40,41 so that they are illuminated in sequence.

The display device would be controlled, by a suitable controller (not shown), to display a first image in a first time frame. If the first image is intended to be displayed in the first range of directions, for example to a first viewer, the backlight is accordingly controlled to emit light primarily in the first range of directions in this time frame. For example, the controller may control the backlight so that the first light source 40 is ON and the second light source 41 is OFF in this time frame. Thus, in the first time frame the first viewer would see the displayed image but a second viewer located in the second range of directions would not see the image (since the backlight was emitting no light in the second range of directions.)

In the second time frame, the display device would be controlled, by the controller, to display a second image that is intended to be displayed in the second range of directions, for example to a second viewer. The backlight is controlled to emit light primarily in the second range of directions in this time frame. For example, the controller may control the backlight so that the second light source 41 is ON and the first light source 40 is OFF in this time frame. Thus, in the second time frame the second viewer would see the displayed image but the first viewer located in the first range of directions would not see the image (since the backlight was emitting no light in the first range of directions).

In the third time frame the controller would control the backlight so that the first light source 40 is again ON and the second light source 41 is again OFF. The display device would display the next image intended for the first viewer (and this might be the same as the image displayed in the first time frame, in the case of a still image, or it might be the next of a sequence of images in the case of a moving image.) Thus, in the third time frame the first viewer would see the displayed image but the second viewer would not see the image.

Similarly, in the fourth time frame the controller would control the backlight so that the second light source 41 is again ON and the first light source 40 is again OFF. The display device would display the next image intended for the second viewer (and this might be the same as the image displayed in the second time frame, in the case of a still image, or it might be the next of a sequence of images in the case of a moving image.) Thus, in the fourth time frame the second viewer would see the displayed image but the first viewer would not see the image.

In a conventional backlight in which light sources are arranged alongside edges of a waveguide, it is normal to dispose the light sources along the top and bottom side edges of the display. The width of a display is typically greater than its height, so that placing the light sources along the top and bottom side edges of the waveguide allows longer, and hence brighter, light sources to be used. In order to offset any reduction in intensity of the backlight that may be caused by the need to provide the light sources 40, 41 along the side edges of the waveguide, it would be possible to provide two light sources along each side edge of the waveguide 39. The light sources 40, 41 may be, for example, fluorescent light tubes or arrays of light-emitting diodes.

The waveguide 39 of FIG. 10 may alternatively be provided with an array of prisms on its rear face, as on the waveguide 23 of FIG. 6c. Providing an array of prisms on the rear face of the waveguide should improve the collimation of light emitted from the waveguide. If provided, the prisms should extend parallel to the light tubes 40,41 of FIG. 10, so as to reduce the angle of spread theta of the output light in the plane perpendicular to the light tubes 40,41. The prisms may be inclined, as described with reference to FIG. 6c.

FIG. 12a is a schematic plan view of a multiple view display according to a further embodiment of the present invention. The display 47 comprises an image display device for displaying first and second images. The image display device has an image display layer 43 that includes a plurality of pixels. Other components of the image display device have been omitted from FIG. 12a for clarity. The image display device may be any suitable image display device, and may be, for example, a liquid crystal display device. The display device is illuminated by a backlight 42 disposed behind the display device. The images may be displayed in a spatially multiplexed manner, and FIG. 12a indicates that columns of pixels are displaying alternately an image for a left observer (denoted by L) and an image for a right observer (denoted by R). The pixel columns extend into the plane of the paper in FIG. 12a.

The backlight 42 of the display 47 is not a directional backlight, and emits light in a range of directions. The display 47 is provided with an observing arrangement that permits the first and second images to be visible from first and second ranges of directions respectively, and that prevents the first and second images from being visible from a third range of directions that includes the normal to a display surface of the device. The first and second ranges are not overlapping with the third range, and are preferably on opposite sides of the normal to a display surface of the display to one another. The first and second ranges may, as in previous embodiments, be substantially symmetrical about the normal to the display surface. The centres of the first and second ranges preferably subtend an angle at the device of between 20° and 140°. They may subtend an angle at the device of less than 130°, of less than 120°, of less than 110°, of less than 100° or of less than 90°. They may subtend an angle at the device of greater than 30°, of greater than 40°, of greater than 50°, of greater than 60° or of greater than 70°. They may subtend an angle at the device of approximately 80°. The observing arrangement preferably prevents the first image from being visible from the second range of directions, and also preferably prevents the second image from being visible from the first range of directions.

In FIG. 12a the observing arrangement comprises a colour filter barrier 44. The colour filter barrier 44 comprises a plurality of transmissive regions separated by opaque portions 46. The transmissive regions are each transmissive to a selected wavelength range. A region 45G is transmissive to light in the green wavelength of the spectrum and is not transmissive to red or blue light, a region 45R is transmissive to light in the red portion of the spectrum and is not transmissive to green or blue light, and a regions 45B is transmissive to light in the blue portion of the spectrum and is not transmissive to red or green light. The transmissive regions are therefore referred to as 'green regions', 'red regions', or 'blue regions' respectively.

The image display layer 43 comprises colour pixels. Pixels 43R transmit light in the red portion of the spectrum, but block blue and green light from the backlight 42. The pixels 43R produce an image in the red portion of the spectrum, and will therefore be referred to as 'red pixels'. Similarly, pixels 43G are transmissive only to light in the green portion of the spectrum and so produce a green image and are known as 'green pixels', and pixels 43B transmit only light in the blue portion of the spectrum and are known as 'blue pixels'.

The green, red and blue regions in the colour filter barrier are arranged, relative to the pixels, so that a region that transmits light of a particular colour is not placed immediately in front of a pixel of that colour. The green regions 45G of the colour filter barrier, for example, are not placed in front of green pixels 43G; the green apertures 45G of the colour filter barrier 44 are laterally displaced with respect to the green pixels 45G. Light from the green pixels 43G is therefore transmitted in first and second ranges of directions, at an angle to the normal to the display face of the display 47. Similarly, red regions of the colour filter barrier are not placed in front of red pixels, and blue regions 45B of the colour filter barrier are not placed in front of red pixels 43R. Light from red and blue pixels is therefore not transmitted through the colour filter barrier in directions parallel to or close to the normal direction to the display face of the display. Red and blue light is again emitted in first and second ranges of directions that are spaced from the normal direction.

As an example, the 'blue' region 45B in the colour filter barrier 44 blocks light from the red and green pixels 43R, 43G that are placed substantially directly behind it, as shown by the arrows in full lines in FIG. 12a.

It will be noted that this embodiment does not re-direct light from the normal direction into the viewing directions—light emitted by the backlight in the normal direction will be blocked by the colour filter barrier, as shown by the full arrows. This embodiment therefore does not increase the intensity of light emitted along the intended viewing directions, although it does create a 'black window' between the viewing windows.

The angular extent of the 'black window' is determined by the width of the transmissive regions 45B, 45G, 45R, and the smaller is the width of the transmissive regions 45B, 45G, 45R the greater will be the angular extent of the black central window. The width of the transmissive regions 45B, 45G, 45R in a particular display can therefore be selected to give a black window having the angular extent desired for that display.

The colour pixels in this embodiment may, as is well-known, be obtained by providing colour filters over a conventional image display layer.

Figure 12B:
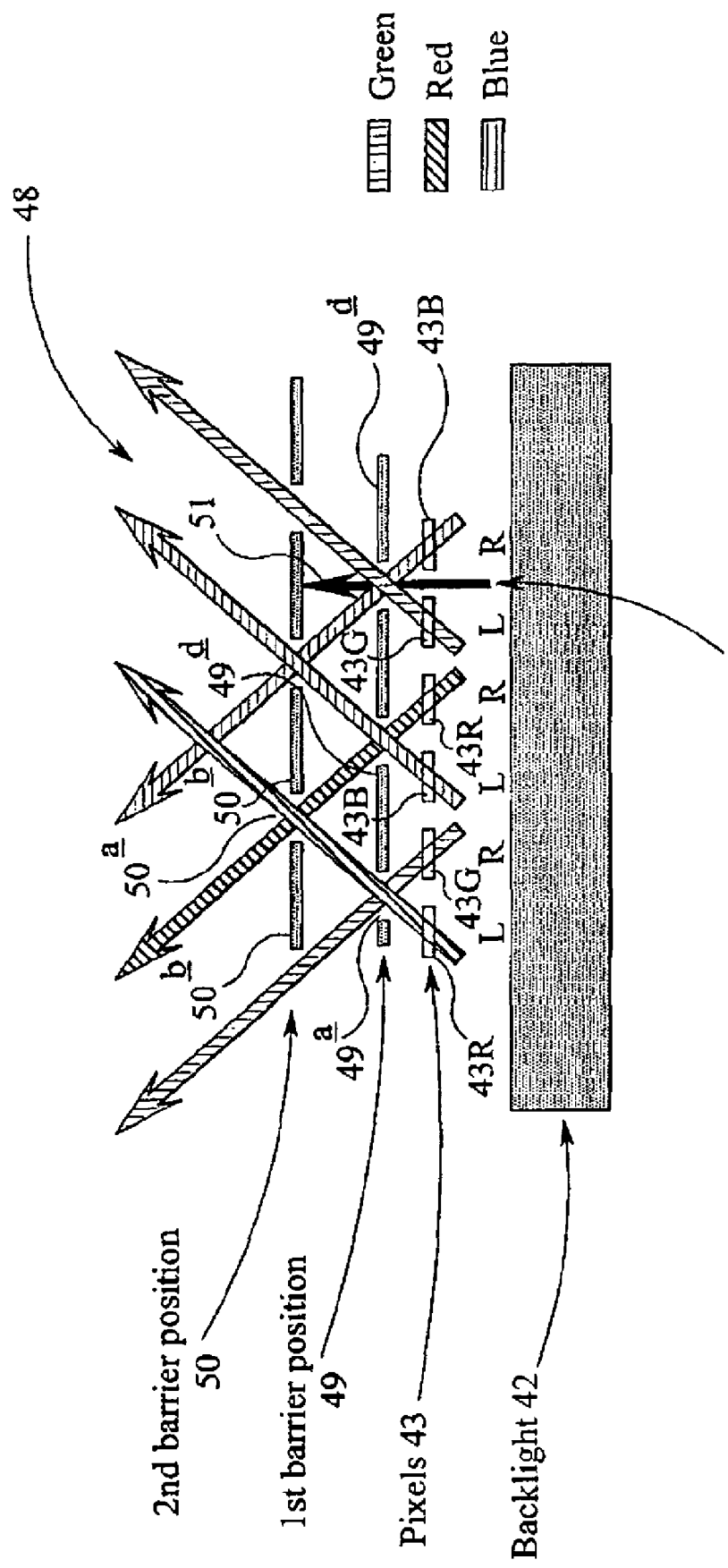

FIG. 12b shows a further multiple view display 48 of the present invention. This again comprises a directional display device for displaying first and second images; only the image display layer 43 of the display device is shown, and other components of the display device are omitted for clarity. The image display layer is again a pixellated display layer that comprises a plurality of colour pixels including red pixels 43R, green pixels 43G and blue pixels 43B. FIG. 12b illustrates the image display device displaying two interlaced images, with images for left and right observers being displayed on alternate columns of pixels as denoted by L (for pixel columns displaying the left image) and R (for pixels displaying the right image).

The multiple view display 48 of FIG. 12b further comprises an observing arrangement for permitting the first and second images to be visible from first and second range of directions respectively, while preventing the first and second images from being visible from a third range of directions that includes the normal to the display surface of the device. In this embodiment the observing arrangement comprises two parallax barriers 49, 50. The first parallax barrier 49 is disposed in front of the image display layer 43, and the second parallax barrier 50 is disposed in front of the first parallax barrier. Each parallax barrier comprises transmissive region 49a, 50a, separated by opaque regions 49b, 50b. The transmissive region 49a, 50a and the opaque regions 49b, 50b extend into the plane of the paper and so have the form of transmissive strips or opaque strips respectively. The two parallax barriers 49, 50 are arranged such that a transmissive region 50a of the second barrier 50 is not disposed directly in front of an transmissive region 49a of the first parallax barrier 49. The two parallax barriers are arranged such that an transmissive region 50a in the second parallax barrier 50 is disposed in front of an opaque region 49b of the first parallax barrier, and so that an opaque region 50b of the second parallax barrier 50 is disposed in front of a transmissive region 49a of the first parallax barrier. As a result, light emitted by the backlight 42 in a direction parallel to, or close to, the normal of the display face of the display is blocked by one or other of the parallax barriers 49, 50. This is indicated by the full black arrow 51 in FIG. 12b. Because the two parallax barriers are arranged such that transmissive region 50a in the first parallax barrier 50 are laterally offset with respect to transmissive region 49a in the first parallax barrier, light that leaves the second parallax barrier 50 is travelling in first and second ranges of directions, as shown in FIG. 12b. This embodiment again provides a multiple view display in which the first and second images are not visible from a range of directions that includes the normal to the display surface of the device.

One or both of the two barriers 49, 50 could be disposed between the backlight 42 and the pixellated display device. If one or both of the two barriers 49, 50 is disposed between the backlight 42 and the pixellated display device, it is preferable that the opaque regions of the barrier nearest to the backlight 42 are reflective, so that any light that is blocked by the opaque portions is returned to the backlight and can subsequently be re-emitted.

The angular extent of the 'black window' between the first and second ranges is determined by the width of the transmissive regions 49a, 50a of the two parallax barriers 49,50, and the smaller is the width of the transmissive regions of the parallax barriers the greater will be the angular extent of the black central window. The width of the transmissive regions 49a,50a of the parallax barriers in a particular display can therefore be selected to give a black central window having the angular extent desired for that display.

FIG. 12c shows a multiple view display 52 according to a further embodiment of the present invention. This multiple view display 52 again comprises a display device for displaying first and second images. Only the image display layer 43 of the display device is shown, and other components of the display device are omitted for clarity. The image display layer 43 is again a pixellated image display layer that comprises colour pixels—pixels 43R are red pixels, pixels 43G are green pixels, and pixels 43B are blue pixels. The image display layer 43 is shown as displaying two interlaced images, with a left image and a right image for left and right observers being displayed on alternate columns of pixels as denoted by L and R in FIG. 12c.

The image display layer 43 in this embodiment is provided with a black mask between the pixels. That is, regions 53 of the image display layer between adjacent pixels are made non-transmissive to light from the backlight 42.

The display 52 further comprises a parallax optic 49 disposed in front of the image display layer 43. In the embodiment of FIG. 12c the parallax optic is a conventional parallax barrier having transmissive portions 49a separated by opaque portions 49b. The opaque portions 49b and transmissive portions 49a extend into the plane of the paper.

The parallax optic 49 services to spatially separate the two images displayed on the image display layer, so that one image is displayed along a first range of directions and the second image is displayed along a second range of directions different from the first range of directions. The manner in which the parallax optics does this is conventional and will not be described further. In this embodiment, however, the presence of the opaque portions 53 of the black mask between adjacent pixels of the image display layer 43 reduces the intensity of light that is transmitted in directions along or close to the normal to the display face of the display 52. The parallax optic and the image display layer are arranged so that, as far as possible, an opaque portion 53 of the black mask of the image display layer is arranged behind an aperture 49a in the parallax barrier 49. The opaque portions 53 of the black mask therefore prevent light being transmitted through the apertures 49a of the parallax barrier in a direction parallel to, or close to, the normal to the display face of the display. The display 52 of FIG. 12c will therefore emit a much lower intensity of light in directions parallel or close to the normal direction of the display face of the device. The intensity of the emitted light in, for example, the image mixing region shown in FIG. 5a will therefore be much lower in the display 52 than in a conventional display.

The angular extent of the black central window is determined by the width of the non-transmissive black mask regions 53, and the greater is the width of the non-transmissive black mask regions the greater will be the angular extent of the black central window. The width of the non-transmissive black mask regions in a particular display can therefore be selected to give a black central window having the angular extent desired for that display.

Figure 13:
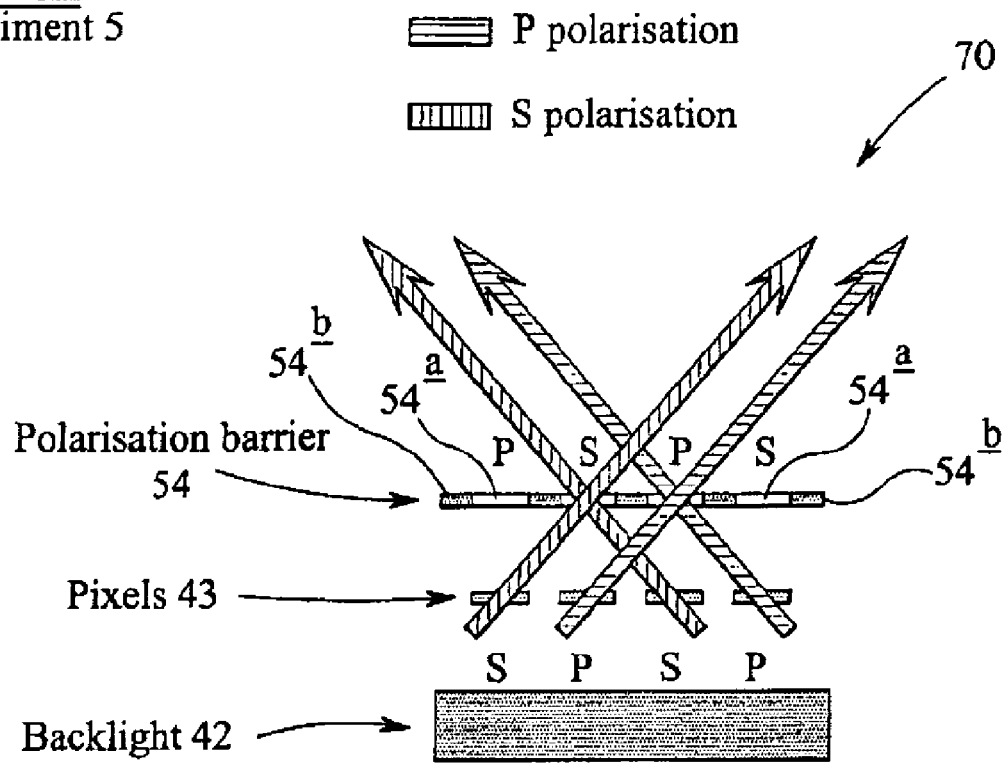
FIG. 13 is a schematic plan view of a multiple view display according to a fifth embodiment of the present invention.

FIG. 13 shows a multiple view display 70 according to a further embodiment of the present invention. The display 70 again comprises an image display device disposed in front of a uniformly-emitting backlight 42. The image display device has an image display layer having pixels 43. The image display layer is able to display two images as described in previous embodiments and, as in previous embodiments, other components of the image display device have been omitted for clarity.

The multiple view display 70 further comprises an observing arrangement that permits first and second images displayed on the image display device to be viewed in first and second ranges of direction respectively, while preventing the first and second images from being visible from a third range of directions that includes the normal to a display surface of the device. In this embodiment the observing arrangement comprises a parallax barrier 54 having transmissive portions 54a and opaque portions 54b. In this embodiment the transmissive portions 54a of the parallax barrier 54 are polarising apertures and transmit light of one polarisation while substantially blocking light of an orthogonal polarisation. The pixels 43 emit light of either the first polarisation state or the second polarisation state. In FIG. 13 the two polarisation states are taken to be the P- and S-linear polarisation states. Pixels 43 are labelled with an 'S' or a 'P' to denote whether they denote light having the S-polarisation or light having the P-polarisation respectively. The transmissive portions 54a of the parallax barrier 54 are also labelled with a P or a S to denote whether they transmit light having the P-polarisation or the S-polarisation respectively.

The parallax barrier 54 is arranged such that an aperture 54a that transmits light of a particular polarisation is not in front of a pixel that emits light of that polarisation. Thus, the apertures 54a that transmit the P-polarisation state are not arranged in front of pixels 43 that emit the P-polarisation state, and apertures 54a that transmit the S-polarisation state are not arranged in front of pixels that emit the S-polarisation state. As a result, the light that is emitted by a pixel of one polarisation state can only pass through the parallax barrier 54 in first and second ranges of directions that are different from, and lie on opposite sides of, the normal to the display face of the display. Light that is emitted by, for example, a S-pixel in a direction parallel or close to the normal direction will be incident on an aperture 54a that transmits only the P-polarisation or on an opaque portion 54b of the parallax barrier, and so will be blocked. The intensity of light emitted by the display of this embodiment in the normal direction, or in directions close to the normal direction, is therefore low. The device thus provides a black window between the viewing windows of the two images.

A black mask (not shown) is provided between adjacent pixels 43. The angular extent of the black central window can be varied by altering the black mask:pixel ratio (while keeping the pixel pitch constant). The greater is the width of the black mask between adjacent pixels, the greater is the angular extent of the black central window.

The angular extent of the black central window is also determined by the width of the polarising apertures 54a of the parallax barrier 54. The angular extent of the black central window may also be varied by changing the width of the polarising apertures (while keeping the aperture pitch constant). The smaller is the width of the polarising apertures of the parallax barrier the greater will be the angular extent of the black central window.

Figure 14A:
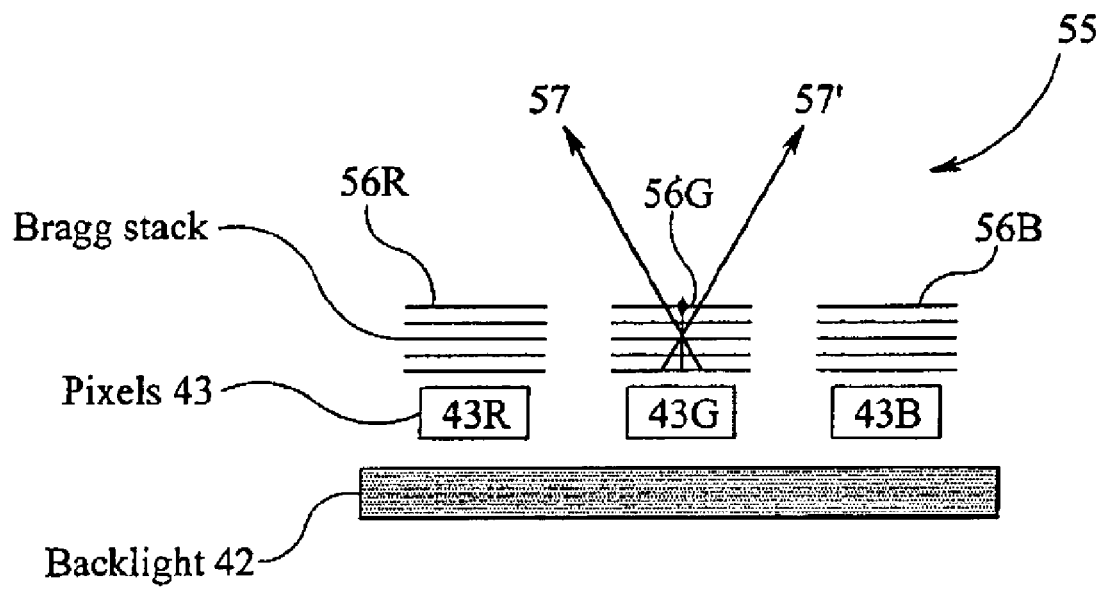
FIG. 14a is a schematic plan view of a display according to a sixth embodiment of the present invention.

FIG. 14a shows a display 54 according to a further embodiment of the present invention. The display again comprises a display device disposed in front of a backlight 42. The display device has a pixellated display layer that can display first and second images in the manner described above for previous embodiments. In this embodiment the display device is a full-colour display device and has red pixels 43R, green pixels 43G and blue pixels 43B. Other components of the display device, such as a parallax optic for ensuring that each displayed image is visible from only a particular respective range of viewing angles, are omitted from FIG. 14a for clarity.

The display 55 is further provided with an observing arrangement for permitting first and second images displayed on the image display layer 43 to be visible from first and second ranges of directions respectively, while preventing the first and second images from being visible from a third range of directions that includes the normal 2a display surface of the display. In this embodiment the observing arrangement comprises a plurality of Bragg stacks 56R, 56G, 56B, with one Bragg stack being arranged in front of each pixel of the image display layer 43. As is well-known, a Bragg stack comprises a plurality of layers that are partially reflective and partially transmissive. The layers are arranged such that, when light passes perpendicularly through the Bragg stack, interference occurs between light reflected from the various layers of the Bragg stack. In this way, it is possible to provide a Bragg stack that will block light from passing through it in the normal direction.

The parameters of each Bragg stack, such as the refractive indices of the layers, the thickness of the layers, and the number of layers, are optimised for each colour pixel. Thus, a Bragg stack 56R in front of a red pixel 43R will be optimised so as to block the transmission of red light propagating in the normal direction through the Bragg stack. Similarly, a Bragg stack 56G in front of a green pixel will be optimised to block the transmission of green light in the normal direction, and a Bragg stack 56B disposed in front of a blue pixel will be optimised to block the transmission of blue light in the normal direction. Thus, the display 55 of FIG. 14a will emit little or no light in the direction normal to the display face of the device, since this light is blocked by the Bragg stacks 56R, 56G, 56B.

A Bragg stack will not, however, block light that is passing through the stack at an angle that is significantly different from normal direction. Thus, the display 55 will emit light in directions that are significantly different from the normal direction, as shown by the arrows 57, 57' in FIG. 14a. The display 55 will therefore display the first and second images along the first and second directions, respectively, while providing a substantially black window between the first and second images.

This embodiment is not limited to Bragg stacks. Any suitable colour sensitive reflector that reflects on-axis light of a particular wavelength while transmitting off-axis light of that wavelength such as, for example, a cholesteric liquid crystal or a reflector formed of a stack of thin metal films, may be used.

Figure 14B:
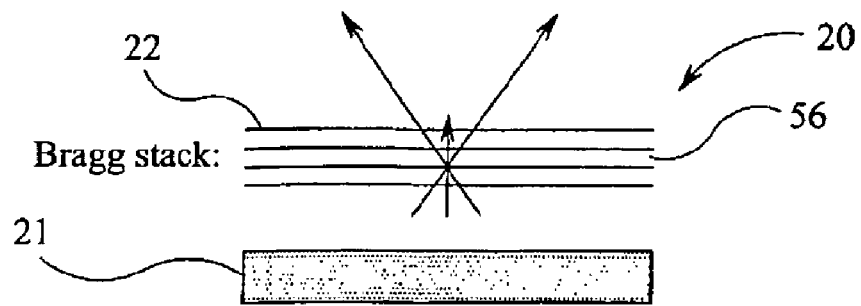
FIG. 14b is a schematic plan view of another display according to the sixth embodiment of the present invention.

FIG. 14b shows a further directional backlight 20 suitable for use in a display of the invention. The backlight 20 comprises a light source 21 and an optical arrangement 22 for directing light from the backlight into first and second angular ranges. The light source 21 may be any light source that emits light over an area and may be formed by, for example, a waveguide and one or more light sources disposed along respective side edges of the waveguide as shown in FIG. 10.

The optical arrangement comprises a colour sensitive reflector 56 such as, for example a Bragg stack, a cholesteric liquid crystal or a reflector formed of a stack of thin metal films. The colour sensitive reflector 56 is arranged such that it reflects light propagating along the axis of the backlight. Light that is propagating at an angle to the axis of the backlight is, however, transmitted. Thus, the directional backlight 20 emits substantially no light along its axis. The intensity of the emitted light increases as the angle from the axis of the backlight increases, reaching a maximum at the first angle for which the effective film separation for light propagating at that angle satisfies the Bragg condition for constructive interference. As the angle from the axis further increases the intensity of the emitted light decreases. (In principle further intensity maxima could be obtained at higher angles from the axis, but if the first maximum in intensity is arranged to occur at an angle of ±30-40° it is unlikely that there will be a second intensity maximum in the angular range of from 0° to ±90°.)

Figure 15:
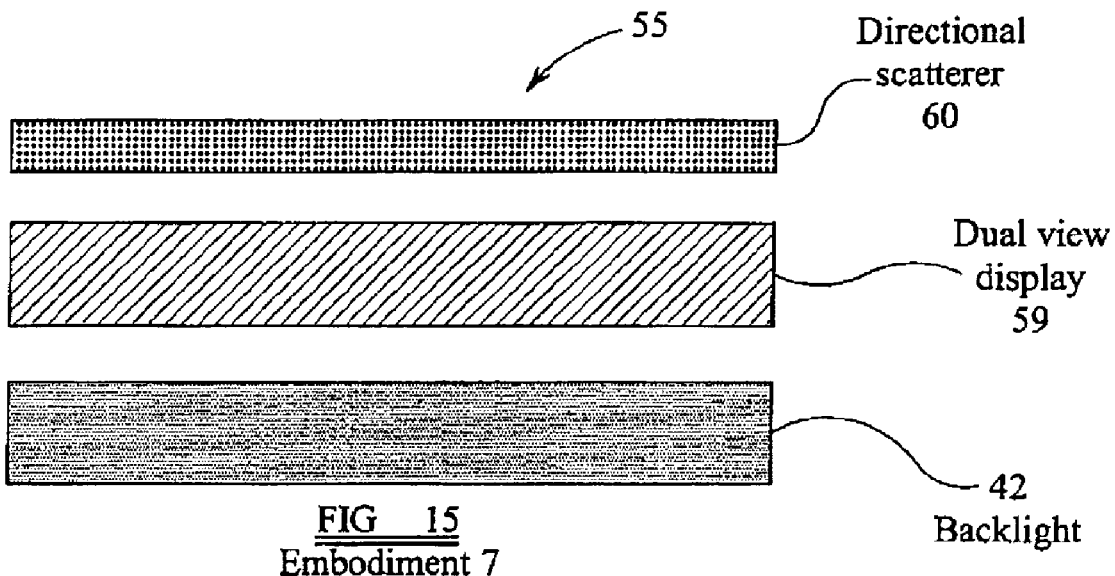
FIG. 15 is a schematic view of a multiple view display according to a seventh embodiment of the present invention.

FIG. 15 shows a multiple view display 58 according to a further embodiment of the present invention. The display 58 comprises a backlight 43, a directional display device 59 such as, for example, a dual view display, and a directional scatterer 60 disposed in front of the multiple view display 59. The directional display device 59, as is known in the art, displays two images such that a first image is visible from a first range of directions and a second image is visible from a second range of directions different from the first range.

The directional scatterer 60 is effective at scattering light that is propagating along the normal axis of the display, and so will scatter the image that is seen when the display is viewed in the normal direction. Thus, an observer viewing the display along a direction parallel or close to the normal direction of the display face will not see an image, since the image is blurred by the directional scatterer. The directional scatterer does not, however, scatter light that is passing through it at an oblique angle. Thus, the two images displayed on the directional display device 59 will be visible in the normal viewing directions—as explained above, a typical viewing angle for a dual view display is ±40° from the normal direction, and light incident on the directional scatterer at an angle of ±40° to the normal axis will not be scattered. Thus, display of the two images in their intended viewing directions will not be affected by the directional scatterer 60.

Thus, when the display 58 is viewed from the left or right, it will appear as a normal multiple view directional display, since the directional scatterer 60 has no effect on light passing through it in these directions. However, when the display is viewed along the normal direction, the observed intensity will be low because light emitted in the normal direction by the dual view display 59 will be scattered by the directional scatterer 60. It should be noted that, when the display 58 is viewed in the normal direction, it will appear blurred owing to the scattering caused by the directional scatterer. This may be preferable to seeing a mixture of the two images, as can happen with a conventional dual view display.

A suitable directional scatterer for this embodiment is the 'Lumisty' (trade mark) directional scattering film form Sumitomo Chemical Co. Limited.

The angular extent of the region in which a blurred image is seen will depend on the range of incident angles that are scattered by the directional scattering film. Thus, by using different directional scattering films it is possible to provide displays in which the region in which a blurred image is seen has different angular extents.

In the embodiments of FIGS. 12a-15, the backlight 42 is not a collimated backlight, but may be any conventional backlight such as, for example, a Lambertian backlight.

Figure 16A:
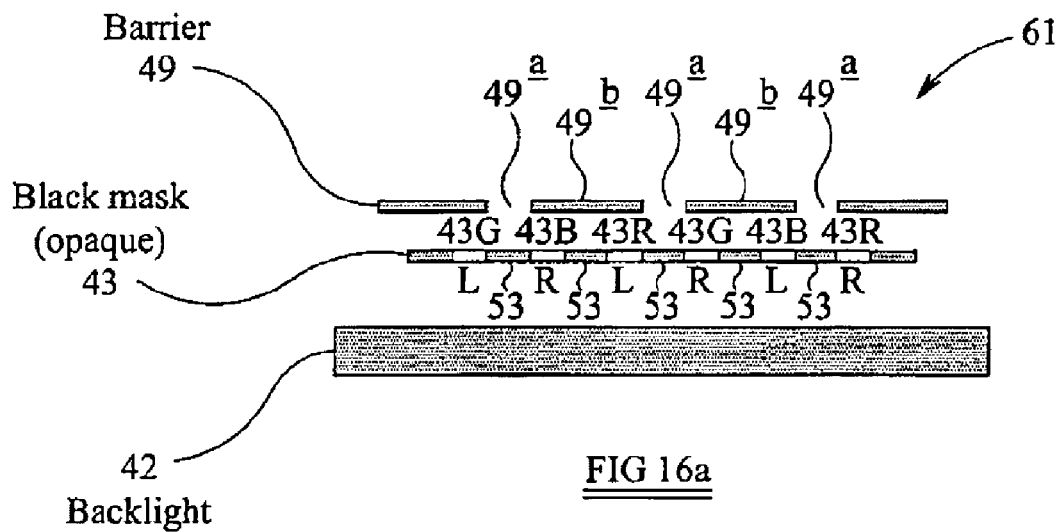
FIG. 16a is a schematic plan view of a multiple view display according to an eighth embodiment of the present invention.

FIG. 16a is a schematic plan view of a further multiple view display 61 according to the present invention. The display comprises a display device for displaying first and second images, a backlight 42, and a parallax barrier 49. Only the pixellated image display layer 43 of the display device is shown in FIG. 16a. The image display layer 43 and the parallax barrier 49 correspond generally to the parallax barrier and image display layer of the display 52 of FIG. 12c, and description of these components will not be repeated.

Figure 16B:
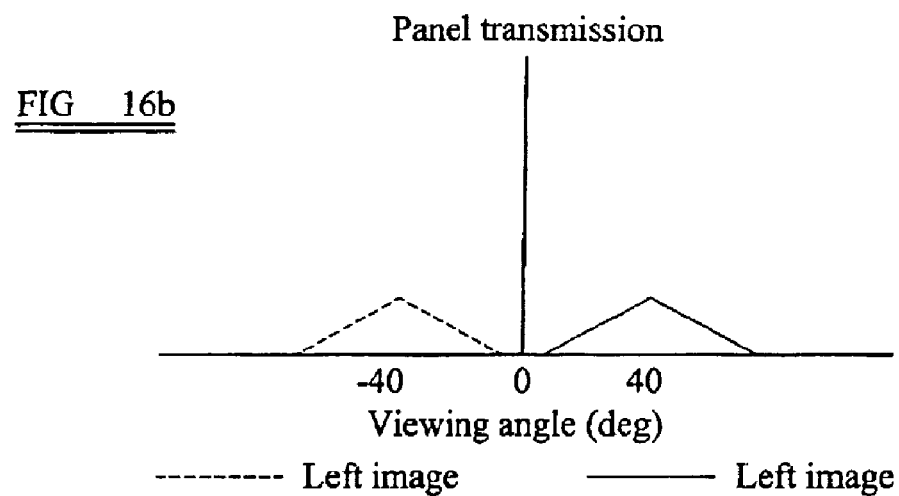
FIG. 16b shows the angular variation of intensity provided by the display of FIG. 16a for a uniform backlight.

FIG. 16b shows the light transmission through the image display layer 43 and the parallax barrier 49 of the display 61 of FIG. 16a, for the case where the width of the transmissive apertures 49a in the parallax barrier 49 is similar to the width of the pixels of the image display layer 43. As can be seen in FIG. 16b, the transmission of the image display layer and parallax barrier has maxima at angles of approximately ±40° from the normal to a display face of the display. Substantially no light is transmitted in the normal direction, and the output light is directed primarily into first and second ranges of direction that are centred on ±40°. The display will therefore provide a central black window between the first and second images.

However, the transmission shown in FIG. 16b varies steeply with changes in viewing angle around the viewing angles at which the transmission is a maximum. This means that if an observer moves their head from side to side, the brightness of the image seen by the observer will vary noticeably, and this can be distracting and uncomfortable for the observer.

According to this embodiment of the invention, therefore, the backlight 42 is not a conventional backlight that emits with substantially uniform intensity in all directions.

In this embodiment, the intensity of light emitted by the backlight depends on the angle of emission, and the variation in intensity with angle is selected so as to at least partially compensate for the angular changes in transmission of the image display layer and the parallax barrier 49.

Figure 17A:
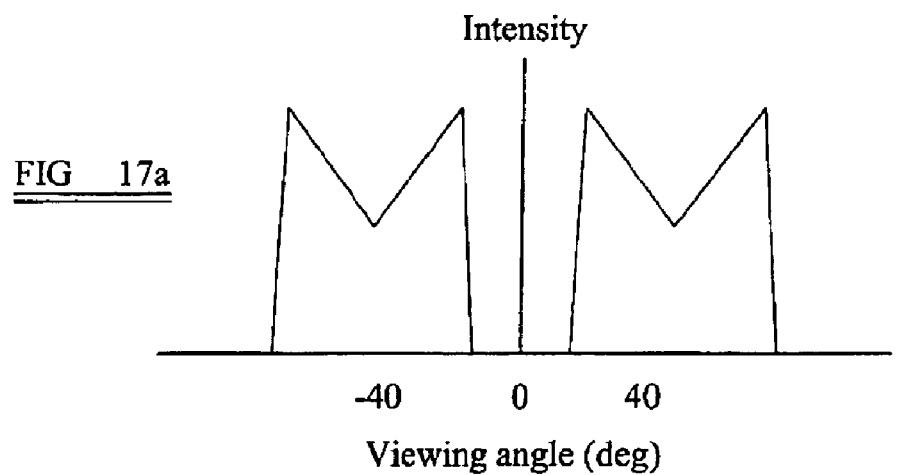

FIG. 17a shows the ideal angular distribution of intensity of light emitted by the backlight 42. In this ideal distribution, the backlight would emit no light in a direction parallel to, or close to, the normal to the display face of the display. The output light from the backlight would be concentrated around the intended viewing directions, in this case ±40°. The intensity is not a maximum at the intended viewing angles, however, but in fact displays a local minimum at each intended viewing angle.

Figure 17B:
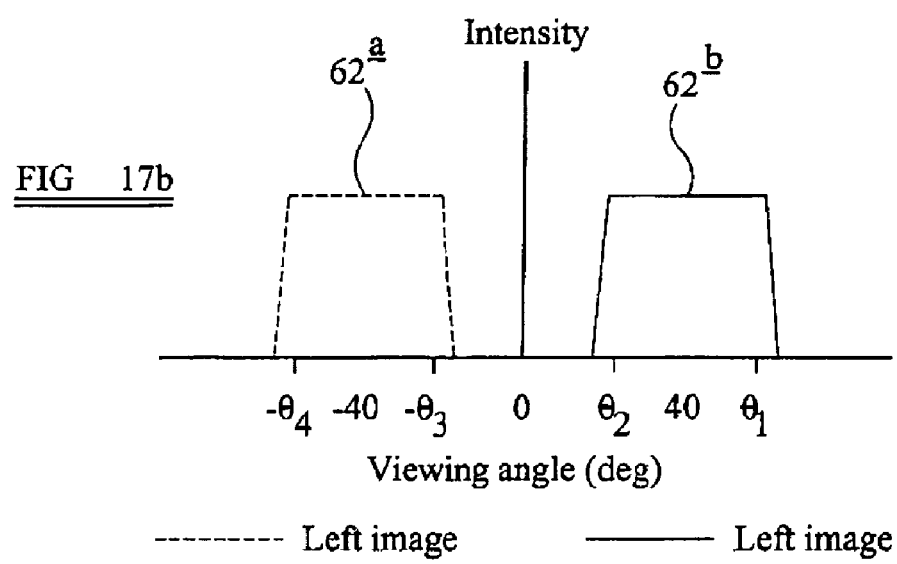

The overall angular distribution of intensity of light emitted by the display 61 is shown in FIG. 17b. The overall intensity is obtained by multiplying the intensity distribution of the backlight shown in FIG. 17a by the transmission of the image display layer and barrier shown in FIG. 16b. In the overall intensity distribution of FIG. 17b, the intensity does not show maxima at the intended viewing angles, but rather exhibits plateau 62a, 62b in the intensity, with each plateau being centred around one of the intended viewing angles. The overall intensity does not vary significantly with the changes in viewing angle in the plateau regions 62a, 62b (and in the ideal case would exhibit no change with angle in the plateau regions 62a, 62b). The plateau regions 62a, 62b extend over the angular ranges from −theta 4° to −theta 3° and from theta 1° to theta 2°, and the overall intensity of the display does not vary significantly until the viewing angle is outside the plateau regions. If an observer viewing the display 61 of this embodiment moves their head from side to side, they will experience significantly no change in intensity, provided that they remain within a viewing angle range of from theta 1 to theta 2 or of from −theta 3 to −theta 4.

In a preferred embodiment the display 61 has viewing properties that are symmetric about the normal to the display face. In this case theta 3=theta 1 and theta 2=theta 4.

Figure 18A:
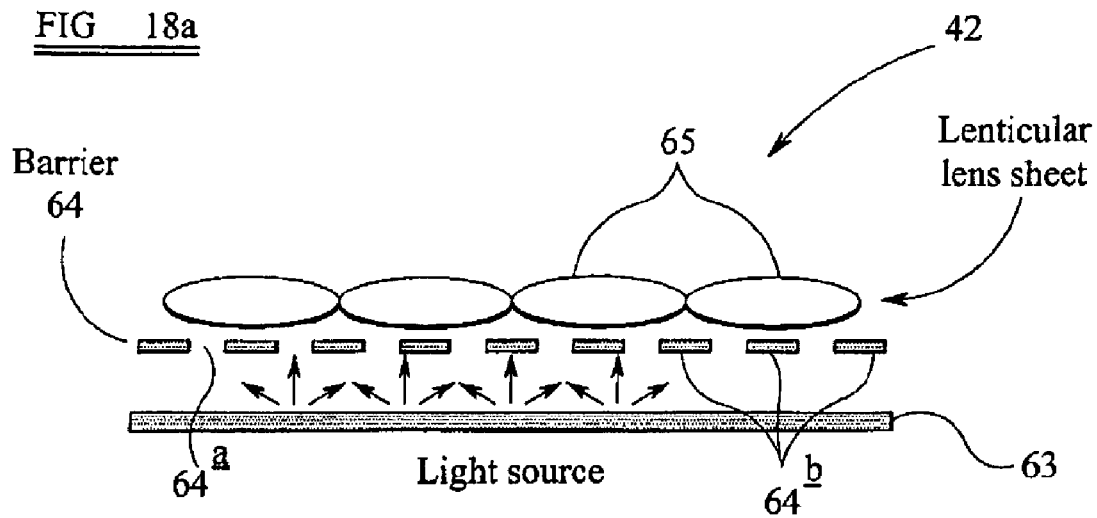

FIG. 18a is a schematic plan view of a backlight 42 having an angular distribution of output intensity similar to that shown in FIG. 17a. The backlight 42 comprises an extended light source 63 that emits light over its area with a substantially isotropic intensity distribution.

A plurality of imaging elements 65 are arranged in front of the light source 63. The imaging elements may constitute, for example, a lenticular lens array. A parallax barrier 64 is disposed between the imaging elements 65 and the light source 63. The parallax barrier comprises a plurality of transmissive regions 64a that are separated by non-transmissive regions 64b. The light-transmissive regions 64a and non-transmissive regions 64b of the parallax barrier extend generally into the plane of the paper in FIG. 18.

Figure 18B:
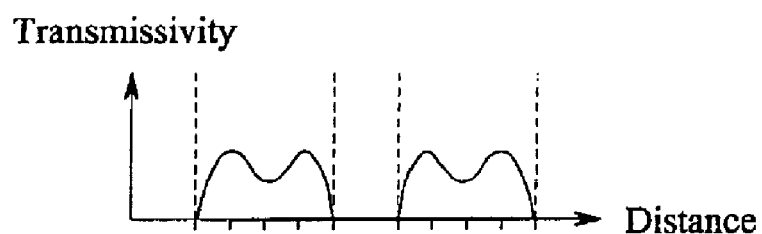

The transmissive regions 64a of the parallax barrier do not have a uniform transmissivity over their width. The transmissivity of each transmissive region 64a has a local minimum approximately mid-way across its width. One possible profile of the transmissivity of the parallax barrier 64 is shown in FIG. 18b.

The parallax barrier and the imaging elements are arranged so that the transmissive regions 64a of the parallax barrier are not disposed on the axis of any of the imaging elements. The imaging elements 65 form images of the transmissive apertures of the parallax barrier, and since the transmissive apertures are not disposed on the axis of the imaging elements the images of the apertures are directed in off-axis directions—that is, they are directed in directions that are not along the normal to the display surface of the display. The directions in which the images of the transmissive apertures 64a are formed can be varied by changing, for example, the imaging power of the imaging elements or the distance between the imaging elements and the barrier.

Furthermore, since the transmissivity of the transmissive apertures 64a has a local minimum approximately mid-way along its width, the intensity of an image of one of the transmissive apertures 64a will also display a local minimum approximately mid-way along the width of the image. Thus, a profile of intensity-against-angle similar to that shown in FIG. 17b is obtained.

The transmissive apertures 64a may be obtained by depositing an opaque material over a substrate in such a way that the thickness of the deposited material is not constant. The transmissivity of the aperture will vary in an inverse dependence on the thickness of the deposited material, and a transmissivity profile having a local minimum may be obtained by depositing the material appropriately. Alternatively, a reflective material may be deposited with varying thickness to obtain a transmissivity profile having a local minimum, and this would have the advantage that light blocked by the barrier would be reflected into the light source 63 and could subsequently be re-emitted.

Figure 19:
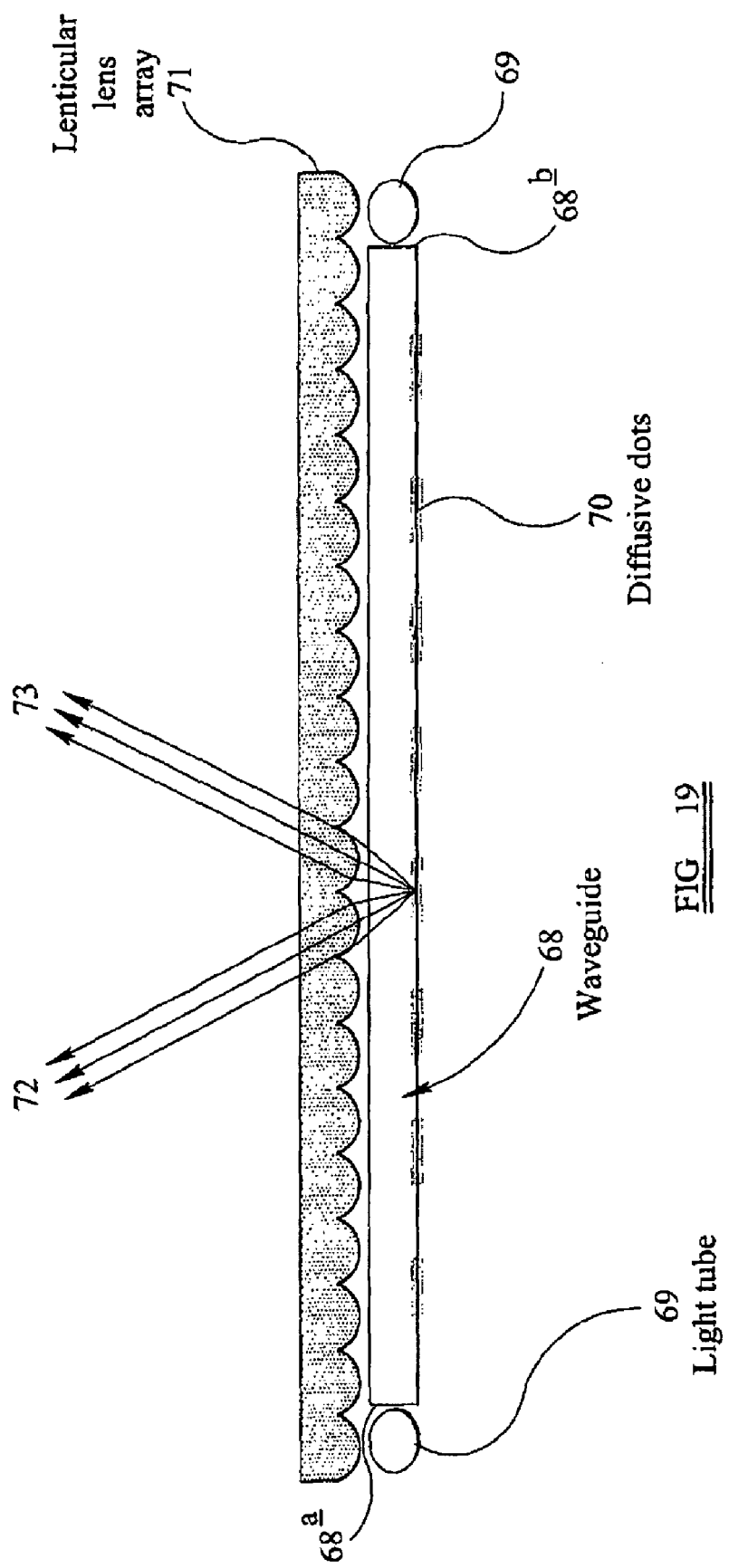
FIG. 19 is a schematic view of another directional backlight of the invention.

FIG. 19 shows a further directional backlight of the invention. The backlight of FIG. 19 comprises a first waveguide 68 and one or more first light sources 69 arranged along sides of the first waveguide. Two first light sources 69 are shown in FIG. 19, arranged along opposite side faces 68a,68b of the first waveguide 74, but the invention is not limited to this specific configuration and only one light source or more than two light sources could be provided. The light sources 68 preferably extend along all or substantially all of the respective side faces of the first waveguide and may be, for example fluorescent tubes.

Diffusive dots are provided at selected regions 70 of the back face 68c of the first waveguide 68. The regions 70 where diffusive dots are present may, for example, be stripe-shaped and extend into the plane of the paper in FIG. 19. If light propagating within the first waveguide is incident on a region 70 of the rear face 68c of the waveguide where diffusive dots are provided, the light is not specularly reflected but rather is scattered out of the first waveguide (in FIG. 19 the observer is assumed to be at the top of the page and light is scattered out of the first waveguide 68 in a generally upwards direction).

Light is scattered out of the first waveguide 68 only in regions 70 where diffusive dots are present, and no light is emitted from the waveguide 68 where there are no diffusive dots. The first waveguide 68 thus has regions that emit light (corresponding to the regions 70 where diffusive dots are present) and has regions that do not significantly emit light. If the regions 70 where diffusive dots are provided have the form of stripes that extend into the plane of the paper in FIG. 19, the regions of the first waveguide 68 that emit light correspond in size, shape and position to the transmissive regions of a parallax barrier, and the regions of the first waveguide 68 that do not emit light correspond in size, shape and position to the opaque regions of a parallax barrier. Thus, a parallax barrier is effectively defined at the front face 68d of the first waveguide 68.

Areas of the first waveguide 68 where there are no diffusive dots may be coated in an absorptive material to ensure no light is scattered from these areas. This reduces the intensity of light emitted by areas of the waveguide that are intended to correspond to the opaque regions of a parallax barrier.

The diffusive dots may consist of diffusive structures, diffractive structures or micro-refractive structures. Their precise structure is not important, provided that light is scattered from the regions 70 where the diffusive dots are provided and is not significantly scattered in regions where the diffusive dots are not provided.

An imaging means such as a lens array 71, for example a lenticular lens array, is disposed in front of the first waveguide 68. The lens array directs light emitted by the first waveguide 68 predominantly into a first direction (or first range of directions) 72 and into a second direction (or second range of directions) 73. The first direction (or first range of directions) 72 and the second direction (or second range of directions) 73 are preferably separated by a third range of directions which includes the normal direction. Since light is directed predominantly into the first and second directions (or first and second ranges of directions) 72,73, the intensity of light in the first and second directions (or first and second ranges of directions) 72,73 is greater than the intensity in the third range of direction. The first direction (or first range of directions) 72 and the second direction (or second range of directions) 73 are on opposite sides of the normal direction, and are preferably substantially symmetrical with respect to the normal.

The backlight of FIG. 19 is particularly suitable for use with a directional display. A typical dual view display, for example, displays two images, with the images being displayed along directions lying on opposite sides of the normal direction. The backlight of FIG. 19 directs light predominantly into the directions in which the two images are displayed by the dual view display, and so produces bright images. In contrast, a conventional backlight has its greatest intensity along the normal direction, and has a low intensity when viewed from an off-axis direction.

A 4 view illumination system can be created by using a 2 D array of microlenses, and a 2 D array of diffusive dots. This will provide four views arranged two views above two views, so providing both horizontal and vertical separation of views.

FIG. 20 shows a further directional backlight of the invention. This backlight is similar to the backlight of FIG. 19 in that it is provided with a first waveguide 68 having regions 70 where diffusive dots are provided and a lens array or other imaging means for directing the emitted light into two preferred directions (or ranges of directions) 72,73. The backlight of FIG. 20 further comprises a second waveguide 74 and second light sources 75 arranged along respective sides of the second waveguide 75. Two second light sources 75 are shown in FIG. 20, arranged along opposite side faces of the second waveguide 74, but the invention is not limited to this specific configuration, and only one second light source or more than two second light sources could be used. The light sources 75 preferably extend along all or substantially all of the respective side faces of the second waveguide and may be, for example fluorescent tubes.

Diffusive dots 76 are provided over substantially the entire front face of the second waveguide 75. Accordingly, when the second light sources 75 are illuminated, light is scattered out of the front surface of the second waveguide over most of its area. The backlight of FIG. 20 is therefore switchable between a 'patterned mode' and a 'uniform mode'. In the 'patterned mode', the first light sources 69 are illuminated and the second light sources 75 are not illuminated. Light propagates only in the first waveguide 68, and the backlight has regions that emit light (these regions correspond to the regions 70 where diffusive dots are present on the first waveguide) and has regions that do not emit light (these regions correspond to the regions where diffusive dots are not present). In the 'uniform mode', the second light sources 75 are illuminated and light propagates in the second waveguide 74. Since diffusive dots 76 are provided over substantially the entire front face of the second waveguide 74, the backlight provides substantially even illumination over its entire area in the 'uniform mode'. A display provided with the backlight of FIG. 20 may be switched from a directional display mode to a conventional 2-D display mode by switching the backlight from the 'patterned mode' to the 'uniform mode'.

In the 'uniform mode', the first light sources 69 can be illuminated or can be not illuminated. If desired, the first light sources can be kept ON continuously, and the backlight is put in either the 'uniform mode' or the 'patterned mode' by switching the second light sources 75 ON or OFF respectively. (Keeping the patterned waveguide illuminated in the uniform mode may cause some variations in intensity across the area of the backlight, but this possible disadvantage may be outweighed in some application by the need to switch only the second light sources 75.)

In order to ensure that internal reflection occurs at the back face 68c of the first waveguide, it is necessary that the space between the first waveguide 68 and the second waveguide 74 has a lower refractive index than the first waveguide 68. This can conveniently be achieved by providing an air-gap between the first waveguide 68 and the second waveguide 74, or alternatively the space between the first waveguide 68 and the second waveguide 74 may be filled with a light-transmissive material having a low refractive index.

In the embodiments of FIGS. 19 and 20, the density of diffusive dots can be adjusted to alter the spatial illumination uniformity, to compensate for the decrease in intensity of light propagating within the waveguide as the distance from a light source 69,75 increases. This may be applied to both waveguides in the embodiments of FIG. 20.

The rear surface of the regions 70 where diffusive dots are provided on the first waveguide 68 may be made reflective, for example by applying a metal coating. If this is done, any light that is scattered downwardly will be reflected back towards an observer. (If the rear surface of the regions 70 where diffusive dots are provided on the first waveguide 74 is made reflective in the backlight of FIG. 20, it is necessary that the first light sources and the second light sources are illuminated to obtain the uniform illumination mode, since the reflector would block light scattered upwards from the second waveguide 74.)

Each waveguide may be provided with an antireflection coating (not shown)

FIG. 21 is a schematic view of another directional backlight of the invention. The backlight 20 comprises a light source 21 and an optical arrangement for directing light from the backlight into first and second angular ranges.

The light source 21 may be any light source that emits light over an area and may be formed by, for example, a waveguide and one or more light sources disposed along respective side edges of the waveguide as shown in FIG. 10.

The optical arrangement 22 comprises at least one linear polarisers and at least one waveplate. The polariser(s) and retarder(s) are arranged such that light propagating in first and second angular ranges has a transmissivity that is substantially greater than the transmissivity of light propagating along the axis of the backlight; preferably, light propagating along the axis of the backlight is blocked, or is transmitted with a low transmissivity.

The specific optical arrangement 22 shown in FIG. 21 comprises first and second linear polarisers 79,77 and a waveplate 78 interposed between the first polariser 79 and the second polariser 77. The linear polarisers are arranged with their transmission axes parallel to one another. The thickness of the waveplate is chosen such that the waveplate is lambda/2 waveplate for light propagating along the axis of the backlight.

Light propagating along the axis of the backlight is converted to plane polarisation by the first polariser 79, and has its plane of polarisation rotated by 90° by the waveplate 78 (since the waveplate constitutes lambda/2 waveplate for light propagating along the axis of the backlight). The plane of polarisation of the light leaving the waveplate 78 is now at 90° to the transmission axis of the second polariser 77, and the light is therefore absorbed by the second polariser 77. The optical arrangement therefore transmits substantially no light along the axis of the backlight.

Light that is propagating at an angle to the axis of the backlight is converted to plane polarisation by the first polariser 79. However, the waveplate 78 does not act as lambda/2 waveplate for light propagating at an angle to the axis of the backlight (since the effective thickness of the waveplate 78 experienced by light propagating at an angle to the axis of the backlight is greater than the actual thickness of the waveplate). Light propagating at an angle to the axis of the backlight therefore has its plane of polarisation rotated by more than 90° by the waveplate 78, and so the polarisation direction of off-axis light incident on the second polariser is not at 90° to the transmission axis of the second polariser 77. Light propagating at an angle to the axis of the backlight is therefore transmitted by the second polariser, with the transmissivity increasing as the angle between the propagation direction and the axis of the backlight increases. The intensity will reach a maximum for light propagating at the angle to the axis for which the waveplate rotates the plane of polarisation by 180°, and will decrease as the angle between the direction of propagation and the axis further increases. (In principle further intensity maxima could be obtained at higher angles, but if the first maximum in intensity is arranged to occur at an angle of ±30-40° it is unlikely that there will be a second intensity maximum in the angular range of from 0° to ±90°.)

The backlights of FIGS. 19, 20 and 21 may be used to illuminate a display panel, which may be a conventional display panel or a directional display panel (such as a dual view display panel), in the manner shown in, for example, FIG. 6a.

The backlights shown in FIGS. 8, 9, 12a, 12b, 12c, 13, 14 and 15 and the light source shown in FIGS. 18a and 21 may each have the general form of a waveguide illuminated by one or more light sources disposed along side edges of the waveguide. If the backlight comprises one (or more) light sources arranged along one side edge of the waveguide and one (or more) light sources arranged along an opposite side edge of the waveguide as shown in FIG. 10, these embodiments may be used to provide a time-multiplexed display by controlling the light sources of the backlight to be illuminated in sequence as described with reference to FIG. 10.

In the embodiments described above, the angular extent of the window between the two viewing windows (the window in which the image is blurred in the embodiment of FIG. 15, or the 'black window' in other embodiments) may be chosen to suit the intended application of the display. For example, the angular extent may be arranged so that the width of the window, at the intended viewing distance of the display, corresponds generally to the width of a human head. This allows an observer to position themselves in the window. Alternatively, the window may extend from an angle of approximately 5° on one side of the normal to the display surface of the device to an angle of approximately 5° on the other side of the normal to the display surface of the device, or from an angle of approximately 10° on one side of the normal to the display surface of the device to an angle of approximately 10° on the other side of the normal to the display surface of the device, or from an angle of approximately 15° on one side of the normal to the display surface of the device to an angle of approximately 15° on the other side of the normal to the display surface of the device, or from an angle of approximately 20° on one side of the normal to the display surface of the device to an angle of approximately 20° on the other side of the normal to the display surface of the device.

The invention claimed is:

1. A directional backlight comprising a light source for emitting light that is at least partially collimated, and an optical arrangement for splitting the light from the light source and directing the light from the light source simultaneously in at least mainly a first range of directions and a second range of directions different from the first range of directions;
wherein the optical arrangement comprises a plurality of prisms, the prisms are arranged as an array of variable pitch, and the prisms have a prism angle greater than 70 degrees.

2. A backlight as claimed in claim 1 wherein the prisms have a prism angle of less than 110°.

3. A backlight as claimed in claim 1 wherein the prisms have a prism angle of approximately 83°.

4. A backlight as claimed in claim 1, in which the light source is arranged to supply at least partially collimated light.

5. A backlight as claimed in claim 4, in which the light source comprises a plurality of apertures aligned with imaging elements.

6. A backlight as claimed in claim 5, in which the apertures are separated by reflectors for reflecting light.

7. A directional backlight comprising a light source, and an optical arrangement for splitting the light from the light source and directing the light from the light source at least mainly in a first range of directions and a second range of directions, the first and second range of directions being on a same side of the optical arrangement, wherein light mainly directed in the second range of directions is non-parallel to and non-overlapping with light mainly directed in the first range of directions,
the first and second range of directions correspond to a first image and a second image, respectively, and the first and second images can be different from each other;
wherein the optical arrangement comprises a waveguide having a plurality of diffusive regions and an array of imaging elements disposed in the optical path of light from the waveguide.

8. A backlight as claimed in claim 7 wherein the light source extends substantially along one side face of the waveguide.

9. A backlight as claimed in claim 8 wherein the directional backlight comprises a second light source, the second light source extending substantially along another side face of the waveguide.

10. A backlight as claimed in claim 1 wherein the optical arrangement is arranged to direct light from the light source at least mainly in the first range of directions, the second range of directions, a third range of directions and a fourth range of directions, the third range of directions being different from the first range of directions and the second range of directions and the fourth range of directions being different from the first range of directions, the second range of directions and the third range of directions.

11. A display comprising: a display device for displaying at least a first image or first sequence of images; and a directional backlight as defined in claim 1 for directing light through the device at least mainly in a first range of directions relative to the device and a second range of directions relative to the device different from the first range of directions.

12. A display as claimed in claim 11 wherein the display device is a directional display device for displaying the first image or sequence of images so as to be mainly visible from the first range of directions relative to the device and for simultaneously displaying a second image or sequence of images so as to be mainly visible from the second range of directions relative to the device.

13. A display as claimed in claim 11, in which the first and second ranges are on opposite sides of the normal to a display surface of the device.

14. A display as claimed in claim 13, in which the first and second ranges are substantially symmetrical with respect to the normal.

15. A display as claimed in claim 12, in which the first image is substantially not visible from the second range.

16. A display as claimed in claim 12, in which the second image is substantially not visible from the first range.

17. A display as claimed in claim 11, in which the first and second ranges are separated by a third range of directions.

18. A display as claimed in claim 17, in which the backlight is arranged to direct substantially no light in at least part of the third range.

19. A display as claimed in claim 12 in which the second image or sequence of images is spatially multiplexed with the first image or sequence of images.

20. A multi-directional two-dimensional display comprising:
a display device for displaying a single image at a time, which image is visible throughout a range of directions including first and second ranges for first and second viewers, the first and second ranges being disposed on opposite sides of and spaced from the normal to a display surface of the device; and
a directional backlight for directing light through the device with higher intensity in the first and second ranges than in a third range including the normal; wherein the directional backlight comprises a light source arranged to supply at least partially collimated light and a prism structure comprising truncated prisms composed of non-curved surfaces to allow the intensity in the third range to be non-zero.

21. A display as claimed in claim 20, in which the first and second ranges are substantially symmetrical with respect to the normal.

22. A display as claimed in claim 20, in which the backlight is switchable between a first mode, in which light is mainly directed in the first range, and a second mode, in which light is mainly directed in the second range.

23. A display as claimed in claim 22, comprising a controller for repeatedly switching the backlight between the first and second modes and for controlling the device to display a first image or sequence of images when the backlight is in the first mode and a second image or sequence of images when the backlight is in the second mode.

24. A display as claimed in claim 20, in which the backlight comprises first and second light sources disposed at opposite edges of a substantially rectangular generally planar light guide.

25. A display as claimed in claim 17 wherein the first image or sequence of images is spatially multiplexed with the second image or sequence of images.

26. A display as claimed in claim 11, in which the centres of the first and second ranges subtend an angle at the device of between 20° and 140°.

27. A display as claimed in claim 26, in which the centres of the first and second ranges subtend an angle at the device of less than 130°.

28. A display as claimed in claim 26, in which the centres of the first and second ranges subtend an angle at the device of less than 120°.

29. A display as claimed in claim 26, in which the centres of the first and second ranges subtend an angle at the device of less than 110°.

30. A display as claimed in claim 26, in which the centres of the first and second ranges subtend an angle at the device of less than 100°.

31. A display as claimed in claim 26, in which the centres of the first and second ranges subtend an angle at the device of less than 90°.

32. A display as claimed in claim 26, in which the centres of the first and second ranges subtend an angle at the device of greater than 30°.

33. A display as claimed in claim 26, in which the centres of the first and second ranges subtend an angle at the device of greater than 40°.

34. A display as claimed in claim 26, in which the centres of the first and second ranges subtend an angle at the device of greater than 50°.

35. A display as claimed in claim 26, in which the centres of the first and second ranges subtend an angle at the device of greater than 60°.

36. A display as claimed in claim 26, in which the centres of the first and second ranges subtend an angle at the device of greater than 70°.

37. A display as claimed in claim 26, in which the centres of the first and second ranges subtend an angle at the device of approximately 80°.

38. A display as claimed in claim 11 and comprising a liquid crystal display device.

* * * * *